(12) United States Patent
Manssour

(10) Patent No.: US 9,025,503 B2
(45) Date of Patent: May 5, 2015

(54) MULTI-DOMAIN NETWORK CODING

(71) Applicant: Telefonaktiebolaget L M Ericsson (publ), Stockholm (SE)

(72) Inventor: Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 41 days.

(21) Appl. No.: 13/889,811

(22) Filed: May 8, 2013

(65) Prior Publication Data

US 2013/0315340 A1 Nov. 28, 2013

Related U.S. Application Data

(63) Continuation of application No. 12/768,357, filed on Apr. 27, 2010, now abandoned.

(60) Provisional application No. 61/259,424, filed on Nov. 9, 2009.

(51) Int. Cl.
*H04B 1/44* (2006.01)
*H04L 27/34* (2006.01)
*H04B 7/155* (2006.01)

(52) U.S. Cl.
CPC ............ *H04L 27/34* (2013.01); *H04B 7/15521* (2013.01)

(58) Field of Classification Search
None
See application file for complete search history.

(56) References Cited

U.S. PATENT DOCUMENTS

| | | | | |
|---|---|---|---|---|
| 5,506,836 | A * | 4/1996 | Ikeda et al. | 370/203 |
| 7,986,746 | B2 * | 7/2011 | Steer | 375/295 |
| 2002/0131486 | A1 * | 9/2002 | Haartsen | 375/229 |
| 2007/0019752 | A1 * | 1/2007 | Kim | 375/260 |
| 2007/0259627 | A1 * | 11/2007 | Sorrells et al. | 455/118 |
| 2010/0040156 | A1 * | 2/2010 | Patel et al. | 375/260 |

* cited by examiner

*Primary Examiner* — Eunsook Choi
(74) *Attorney, Agent, or Firm* — Baker Botts, LLP

(57) ABSTRACT

A communications network (20) comprises a network coding node (24) and a network decoding node (26). A method of operating a communications network (20) comprises, at the network coding node (24), performing multi-domain network coding upon a first signal and a second signal to obtain a network coded signal. The first signal is modulated by a first modulation scheme and the second signal is modulated by a second modulation scheme. At least one of the first signal and the second signal includes information in a phase domain and information in an amplitude domain. The method further comprises transmitting the network coded signal over a link to a receiver (26) and performing multi-domain network decoding of the network coded signal as detected at the receiver (26) to obtain the second signal, the receiver knowing and using the first signal for the multi-domain network decoding.

16 Claims, 18 Drawing Sheets

PERFORMING NETWORK DECODING OF THE NETWORK CODED SIGNAL BY USING THE DETECTED NETWORK CODED SIGNAL, THE FIRST SIGNAL, THE TRANSMIT CONSTELLATION, AND THE FIRST CONSTELLATION TO OBTAIN THE SECOND SIGNAL — 10-1

COMPRISES:

MAPPING THE NETWORK CODED SYMBOL FROM THE TRANSMIT CONSTELLATION TO THE SECOND CONSTELLATION BY COMPENSATING THE NETWORK CODED SYMBOL FOR PHASE AND AMPLITUDE OF THE FIRST SIGNAL — 10-2

*Fig. 10*

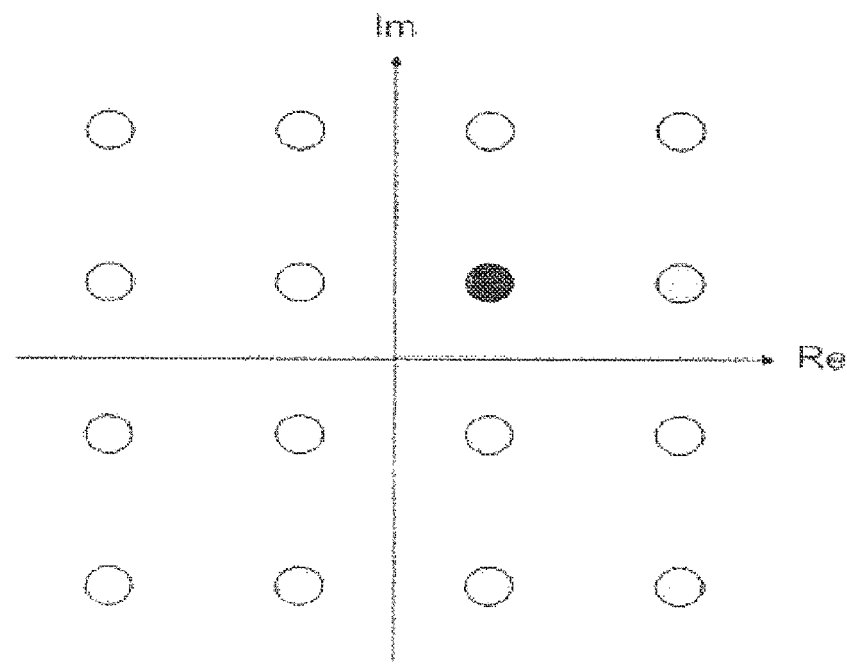

*Fig. 12*

11-1 USING AMPLITUDE COMPENSATION OF THE FIRST SIGNAL TO MAP THE NETWORK CODED SYMBOL FROM THE TRANSMIT CONSTELLATION TO AT LEAST ONE CANDIDATE(S) OF AN ESTIMATE OF THE SECOND SIGNAL ON THE SECOND CONSTELLATION

11-2 WHEN THERE IS MORE THAN ONE CANDIDATE OF THE ESTIMATE OF THE SECOND SIGNAL, PERFORMING PHASE COMPENSATION TO DETERMINE A CORRECT ESTIMATE OF THE SECOND SIGNAL FROM AMONG THE AT LEAST CANDIDATE(S)

*Fig. 11A*

11B-1 USING PHASE COMPENSATION OF THE SECOND SIGNAL TO MAP THE NETWORK CODED SYMBOL FROM THE TRANSMIT CONSTELLATION TO AT LEAST ONE CANDIDATE(S) OF AN ESTIMATE OF THE SECOND SIGNAL ON THE SECOND CONSTELLATION

11B-2 WHEN THERE IS MORE THAN ONE CANDIDATE OF THE ESTIMATE OF THE FIRST SIGNAL, PERFORMING AMPLITUDE COMPENSATION TO DETERMINE A CORRECT ESTIMATE OF THE FIRST SIGNAL FROM AMONG THE AT LEAST ONE CANDIDATE(S)

*Fig. 11B*

MULTI-DOMAIN NETWORK CODING

This application claims the priority and benefit of U.S. Patent Application 61/259,424, filed Nov. 9, 2009, entitled "Generalized Multiplicative Network Coding", which is incorporated herein by reference in its entirety.

BACKGROUND

This technology pertains to wireless communications networks, and in particular to wireless communications networks employing network coding.

A communication system transmits information from an information source to a destination over a communication channel. In wireless communication systems, noise and fading lead to the unreliability of the transmission. One way to overcome this unreliability is through the use of intermediate nodes or relay nodes that help the source to transmit its information to the intended destination. Communication systems using relaying operate under a fundamental principle: the information sent from one source, O1, to a destination, D, is transported independently from other information sent from another source, O2, to the same destination, D. Routers, repeaters, or relays forward the data to the destination.

Network Coding (NC) is a new area of networking in which data is manipulated inside the network to improve throughput, delay, and/or robustness. In particular, network coding allows nodes to combine several input packets into one or several output packets. At intermediate nodes, some (linear) coding may be performed on the available packets, and the resulting encoded packet can be broadcasted to different recipients simultaneously instead of transmitting each packet separately.

The area of network coding was first introduced by R. Ahlswede, N. Cai, S.-Y. R. Li, and R. W. Yeung; Network information flow; IEEE Trans. Info. Theory; July 2000, incorporated herein by reference in its entirety. Ahlswede et al present network coding as a method that allows intermediate nodes (e.g., relays) to perform some processing (coding) on the packets they receive in exchange for throughput gain.

In wireless communications, network coding is generally divided into two generic schemes: analog and digital. Analog network coding refers to coding at the signal level. The analog signals add up in the air at the node performing the network coding operation through simultaneous transmissions, i.e., by letting two signals interfere with each other intentionally. Digital network coding refers to coding at the bit level where the node performing the network coding operation will exclusive OR [XOR] (or alternatively perform other types of encoding on) the bits of the data entities to be encoded.

PCT/SE2008/050861, corresponding to WO2009041884 incorporated herein by reference, describes a novel way of performing network coding, termed as multiplicative network coding (MNC), which includes multiplying the modulated signals to perform the network coding operation. The modulated signals for transmission are assumed to be complex-valued with the information contained in the phase domain.

SUMMARY

In one of its aspects the technology disclosed herein concerns a method of operating a communications network which comprises a network coding node and a network decoding node. The method comprises, at the network coding node, performing multi-domain network coding upon a first signal and a second signal to obtain a network coded signal. The first signal is modulated by a first modulation scheme and the second signal is modulated by a second modulation scheme. To qualify as multi-domain network coding, at least one of the first signal and the second signal includes information in a phase domain and information in an amplitude domain. The method further comprises transmitting the network coded signal over a link to a receiver and performing multi-domain network decoding of the network coded signal as detected at the receiver to obtain the second signal, the receiver knowing and using the first signal for the multi-domain network decoding.

The multi-domain network coding of the technology disclosed herein can be performed in various modes in different embodiments. In a first example mode and embodiment, the network coding is performed using constellation mapping. In a second example mode and embodiment, the network coding is performed using reciprocal modulation.

The constellation mapping modes and embodiments provide new transmit constellations for use in transmitting a network-encoded signal instead of using conventional constellations like BPSK constellation, 16 QAM (Quadrature Amplitude Modulation) constellation, etc. The new constellations are formed based on the modulation schemes of the distinct signals forming the network-coded signal. This makes it possible to perform multiplicative network coding on signals that are modulated with modulation schemes containing information in the phase domain and also in the amplitude domain. The constellations are used to perform network encoding at a network coding node and then used at the receiver (e.g., a network decoding node) in order to network decode the received multi-domain network-coded signal.

In the constellation mapping mode and embodiment, the method comprises: performing multi-domain network coding upon a first signal and a second signal to obtain a network coded signal (at least one of the first signal and the second signal including information in a phase domain and information in an amplitude domain); mapping the network coded signal into a transmit constellation; transmitting to a receiver over the communication link: (1) the network coded signal, and (2) an indication of the transmit constellation; and, at the receiver, using the detected network coded signal, the first signal, the transmit constellation, to obtain (an estimate of) the second signal.

In the constellation mapping mode and embodiment the transmit constellation is obtained using a first constellation of the first modulation scheme of the first signal and a second constellation of a second modulation scheme of the second signal. In some implementations the first and second modulation schemes can be the same modulation scheme. In an example implementation, the transmit constellation is obtained by multiplying every symbol of the first constellation by every symbol of the second constellation.

In an example implementation, the detected network coded signal represents a network coded symbol mapped into the transmit constellation, and the act of using the network coded signal to obtain the second signal comprises de-mapping the network coded symbol from the transmit constellation to the second constellation by compensating the network coded symbol for phase and amplitude of the first signal. Two such example network decoding or de-mapping techniques are described, with both techniques using phase compensation and amplitude compensation. The two techniques differ, however, in the order in which the phase compensation and amplitude compensation are performed.

In the reciprocal modulation mode and embodiment, the method comprises: performing network coding by reciprocal modulation of the first signal and the second signal to obtain a reciprocally modulated symbol that comprises information in both the phase domain and the amplitude domain; transmitting the reciprocally modulated signal over a communication link to a receiver; and, performing network decoding of the reciprocally modulated symbol as detected at the receiver to obtain the second signal, the receiver knowing and using the first signal for the network.

In an example implementation of the reciprocal modulation mode and embodiment, performing the network coding to obtain the reciprocally modulated symbol comprises multiplying amplitudes of the first signal and the second signal to form an amplitude component of the reciprocally modulated symbol; adding phases of the first signal and the second signal to form a phase component of the reciprocally modulated symbol; translating the phase into a consequent complex value with unit magnitude; and multiplying the amplitude component of the reciprocally modulated symbol and the phase translated component of the reciprocally modulated symbol to obtain the reciprocally modulated symbol.

In an example implementation of the reciprocal modulation mode and embodiment, performing network decoding of the network coded signal as detected at the receiver further comprises: removing an amplitude contribution of the first signal from the reciprocal modulated symbol to obtain an amplitude component of the second signal; removing a phase contribution of the first signal from the reciprocally modulated symbol to obtain a phase component of the second signal; and, combining the amplitude component of the second signal and the phase component of the second signal to obtain the second signal.

In accordance with either the reciprocal modulation technique or the constellation mapping technique, in an example implementation the method further comprises demodulating the second signal according to the second modulation scheme.

In another of its aspects the technology disclosed herein concerns a network coding node of a communications network. The network coding node comprises a multi-domain network coding unit and a communications interface (transmitter). The multi-domain network coding unit is configured to network encode a first signal and a second signal to obtain a network coded signal. The first signal is modulated by a first modulation scheme and the second signal is modulated by a second modulation scheme. At least one of the first signal and the second signal includes information in a phase domain and information in an amplitude domain. The communications interface (e.g., a transmitter) is configured to transmit the network coded signal over a communication link to a receiver.

For the constellation mapping mode and embodiment, the multi-domain network coding unit comprises a transmit constellation generator and a mapping unit. The transmit constellation generator is configured to use a first constellation of the first modulation scheme of the first signal and a second constellation of a second modulation scheme of the second signal to obtain a transmit constellation. The mapping unit is configured to map the network coded signal into the transmit constellation. For the constellation mapping embodiment the communications interface (transmitter) is also configured to transmit (over the communication link) an indication of the transmit constellation.

In an example embodiment, the constellation generator is configured to obtain the transmit constellation by multiplying every symbol of the first constellation by every symbol of the second constellation to account for all possible network encoding instances.

For the reciprocal modulation mode and embodiment, the multi-domain network coding unit comprises a reciprocal modulator configured to perform the network coding by performing reciprocal modulation of the first signal and the second signal to obtain a reciprocally modulated symbol that comprises information in both the phase domain and the amplitude domain. In an example implementation, the reciprocal modulator comprises a signal multiplier; an adder; and a component multiplier. The signal multiplier is configured to multiply amplitudes of the first signal and the second signal to form an amplitude component of the reciprocally modulated symbol. The adder is configured to add phases of the first signal and the second signal to form a phase component of the reciprocally modulated symbol. The component multiplier is configured to multiply the amplitude component of the reciprocally modulated symbol and the phase component of the reciprocally modulated symbol to obtain the reciprocally modulated symbol.

In another of its aspects the technology disclosed herein concerns a network decoding node of a communications network. The network decoding node comprises a communications interface (e.g., a receiver) and a multi-domain network decoding unit. The communications interface is configured to receive a network encoded signal over an air interface. The multi-domain network decoding unit is configured to perform network decoding of the network coded signal as detected at the communications interface to obtain the second signal. The multi-domain network decoding unit knows the first signal for the network decoding and also knows that the network coded signal was generated by performing network coding upon the first signal and the second signal, the first signal having been modulated by a first modulation scheme and the second signal having been modulated by a second modulation scheme, at least one of the first signal and the second signal including information in a phase domain and information in an amplitude domain.

For the constellation mapping mode and embodiment, the detected network coded signal represents a network coded symbol mapped into a transmit constellation, the transmit constellation having being obtained using a first constellation of the first modulation scheme of the first signal and a second constellation of a second modulation scheme of the second signal. In the constellation mapping mode and embodiment, the communications interface (receiver) is also configured to receive over the communication link an indication of the transmit constellation.

In the constellation mapping mode and embodiment, multi-domain network decoding unit comprises a de-mapping unit configured to de-map the network coded symbol from the transmit constellation to the second constellation by compensating the network coded symbol for phase and amplitude of the first signal. The de-mapping unit can be configured to perform both a phase compensation operation and an amplitude compensation operation. The order of the phase compensation operation and the amplitude compensation operation can differ in differing embodiments.

In one example implementation, the de-mapping unit is further configured to use the first signal to de-map the network coded symbol from the transmit constellation to the at least one candidate(s) of the estimate of the second signal by compensation (e.g., normalizing) the amplitude of the detected network coded symbol by the amplitude of the first signal and then performing phase compensation.

For the reciprocal modulation mode and embodiment, the network coded signal is obtained by reciprocal modulation of the first signal and the second signal to obtain a reciprocally modulated symbol that comprises information in both the phase domain and the amplitude domain. In an example implementation of the reciprocal modulation mode and embodiment, the multi-domain network decoding unit further comprises an amplitude removal unit; a phase removal unit; and a combining unit. The amplitude removal unit is configured to remove an amplitude contribution of the first signal from the reciprocally modulated symbol to obtain an amplitude component of the second signal. The phase removal unit is configured to remove a phase contribution of the first signal from the reciprocally modulated symbol to obtain a phase component of the second signal. The combining unit is configured to combine the amplitude component of the second signal and the phase component of the second signal to obtain the second signal.

In both the constellation mapping embodiment and mode and the reciprocal modulation embodiment and mode, the network decoding node further comprises a demodulator configured to demodulate the second signal according to the second modulation scheme.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 10 is a diagrammatic view showing that, in an example implementation, using a network coded signal to obtain the second signal can comprise de-mapping the network coded symbol from the transmit constellation to the second constellation by compensating the network coded symbol for phase and amplitude of the first signal.

FIG. 11A is a flowchart illustrating basic, representative acts or steps performed in a first example implementation for compensating the network coded symbol for phase and amplitude of the first signal.

FIG. 11B is a flowchart illustrating basic, representative acts or steps performed in a second example implementation for compensating the network coded symbol for phase and amplitude of the first signal.

FIG. 12 is a graph showing a network coded signal/symbol in its transmit constellation for the purpose of illustrating network coded and network decoding using the constellation mapping technique.

DETAILED DESCRIPTION

Figure 1:
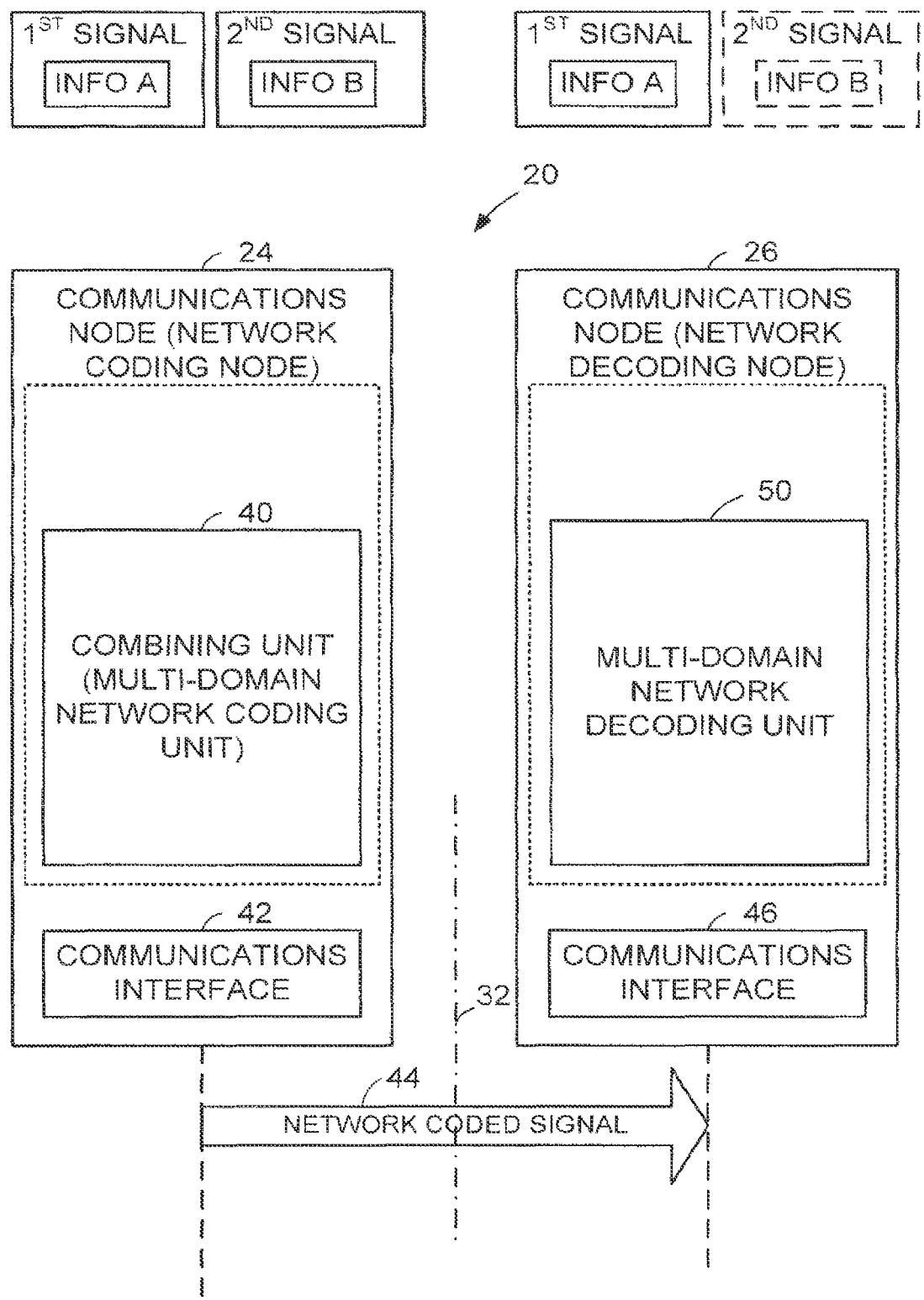
FIG. 1 is a diagrammatic view of portions of wireless communication system including network coding node and network decoding node and suited for multi-domain network coding.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The multiplicative network coding (MNC) presented in PCT/SE2008/050861, referenced above, only applies to modulation schemes where the information resides in the phase domain of the signal. Example modulation schemes usable with the multiplicative network coding (MNC) of PCT/SE2008/050861 include PSK (Phase Shift Keying), QPSK (Quadrature Phase Shift Keying), 4QAM (Quadrature Amplitude Modulation), and so on.

In the technology disclosed herein network coding (e.g., multiplicative network coding (MNC)) can be performed on signals that use a modulation where the information from at least one of the distinct signals forming the network-coded signal is carried in the phase domain and also in the amplitude domain. Thus, an object of the technology disclosed herein is to enable performance of network coding on signals that use a modulation where the information from at least one of the distinct signals forming the network-coded signal is carried in the phase domain and also in the amplitude domain. Therefore, the network coding described herein is also described as "multi-domain" network coding.

The technology disclosed herein concerns, e.g., a network coding method (i.e. a (non-linear) combination of two data entities to be transmitted to two different nodes where each of these nodes has one of the combined data entities) and a corresponding network decoding method (i.e. as each of the two nodes has one of the combined data entities, they could use this a-priori information in conjunction with the network coded data in order to retrieve or network decode the other network-coded data entity termed as desired data entity). "Retrieving" or network decoding includes obtaining either hard or soft estimates of the desired data entity.

As used herein, the following terms have the following meanings:

A distinct signal is a single signal (to be transmitted).

A network-coded signal is a (non-linear) combination of two or more distinct signals.

A distinct constellation is a constellation representing conventional modulation schemes (i.e., PSK, QAM, etc.).

A transmit constellation is the result of the symbol-wise multiplication of two (or more) distinct constellations. It is the constellation used when transmitting a network-coded signal.

1.0 Generic Multi-Domain Network Coding

FIG. 1 shows portions of wireless communication system 20 including network coding node 24 and network decoding node 26. The network coding node 24 and network decoding node 26 communicate across an interface 32. The network coding node 24 and network decoding node 26 can be positioned or function within wireless communication system 20 according to any of several different network topologies. Examples of such topologies include without limitation a bidirectional network coding topology and a cooperative uplink transmission topology such as shown in U.S. patent application Ser. No. 12/768,397, filed on Apr. 27, 2010 entitled "Network Coding Mode Selector", which is incorporated herein by reference in its entirety.

As shown in FIG. 1, network coding node 24 comprises multi-domain network coding unit 40 (also known as a combining unit) and communications interface 42. For the embodiment shown in FIG. 1, communications interface 42 serves as a transmitter for transmitting a network coded signal over the communication link and interface 32 to network decoding node 26.

The multi-domain network coding unit 40 is configured to network encode a first signal and a second signal to obtain a network coded signal. The first signal and the second signal are depicted in FIG. 1 and elsewhere as rectangles positioned over network coding node 24. The first signal includes information A and the second signal includes information B. The first signal is modulated by a first modulation scheme and the second signal is modulated by a second modulation scheme. In some implementations the first and second modulation schemes can be the same modulation scheme. At least one of the first signal and the second signal includes information in a phase domain and information in an amplitude domain. That is, either or both of information A and information B is expressed in the phase domain and the amplitude domain. Although the network coding of PCT/SE2008/050861 cannot be used for network coding that combines information A and information B, the network coding afforded by multi-domain network coding unit 40 can be used for information expressed in both the phase domain and the amplitude domain.

The communications interface 42 is configured to transmit the network coded signal over a communication link (as depicted by arrow 44 in FIG. 1) to network decoding node 26. The network decoding node 26 is often referred to herein as the "receiver" or "receiving node". The network decoding node 26 comprises its communication interface 46 (which functions in the illustrated implementation as, e.g., a receiver) and multi-domain network decoding unit 50.

The communications interface 46 of network decoding node 26 is configured to receive a network encoded signal over interface 32 (as depicted by arrow 44). The multi-domain network decoding unit 50 is configured to perform network decoding of the network coded signal (as detected at the communications interface 46) to obtain the second signal. As used herein, "obtaining" or "network decoding" the second signal encompasses obtaining an estimate of the second signal. Prior to reception of the network coded signal, network decoding node 26 does know the first signal but does not know the second signal (as depicted by solid line and broken line rectangles positioned above network decoding node 26 in FIG. 1). Thus, with the multi-domain network decoding unit 50 knowing the first signal and further knowing that the network coded signal was generated by performing network coding upon the first signal and the second signal, the multi-domain network decoding unit 50 can obtain the second signal. The multi-domain network decoding unit 50 can perform such decoding even though at least one of the first signal and the second signal includes information in a phase domain and information in an amplitude domain.

Figure 2:
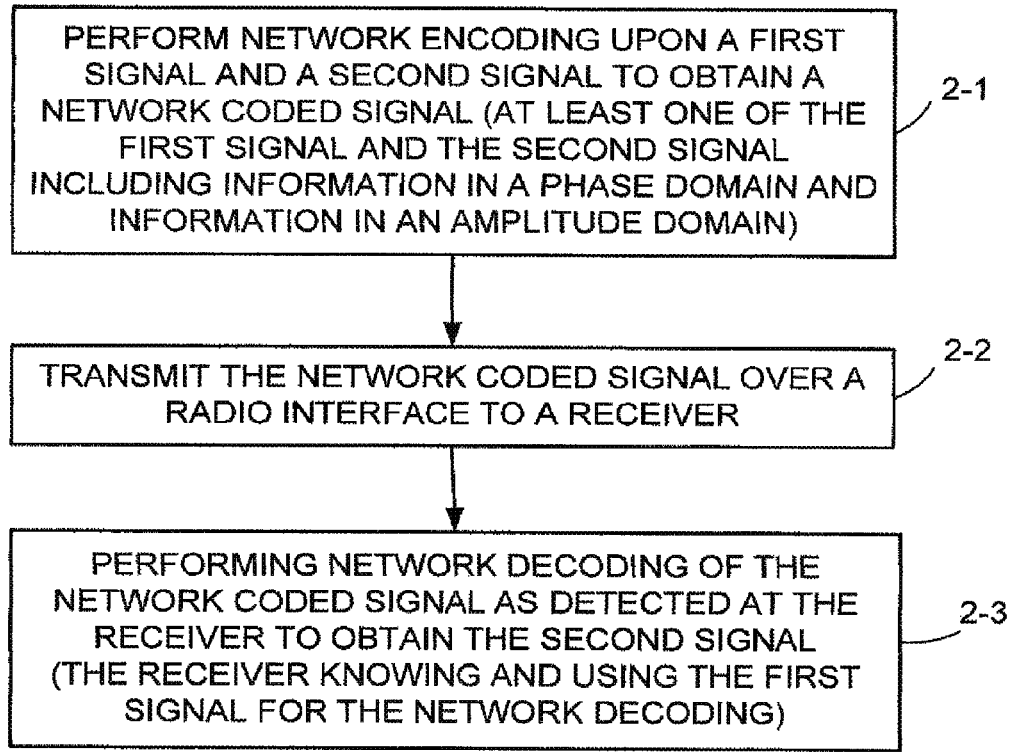
FIG. 2 is a flowchart illustrating basic, representative acts or steps performed by the wireless communication system of FIG. 1 in conjunction with network coding.

FIG. 2 illustrates basic, representative acts or steps performed by the wireless communication system 20 of FIG. 1 in conjunction with network coding. The basic, generic method of FIG. 1 comprises performing (as act 2-1 at multi-domain network coding unit 40 of network coding node 24) network coding upon the first signal and the second signal to obtain the network coded signal. As mentioned above, the first signal is modulated by a first modulation scheme and the second signal is modulated by a second modulation scheme, and at least one of the first signal and the second signal includes information in a phase domain and information in an amplitude domain. Act 2-2 comprises transmitting the network coded signal over interface 32 from network coding node 24 to network decoding node 26 (as depicted by arrow 44 in FIG. 1). It should be understood that FIG. 1 and FIG. 2 are simplified since the network coded signal can be (and usually is) transmitted to multiple recipients as can occur, e.g., in a case of bidirectional relaying. Act 2-2 comprises performing network decoding of the network coded signal (as detected at the receiver) to obtain the second signal, the network decoding node 26 and particularly multi-domain network decoding unit 50 knowing and using the first signal for the network decoding.

Figure 3:
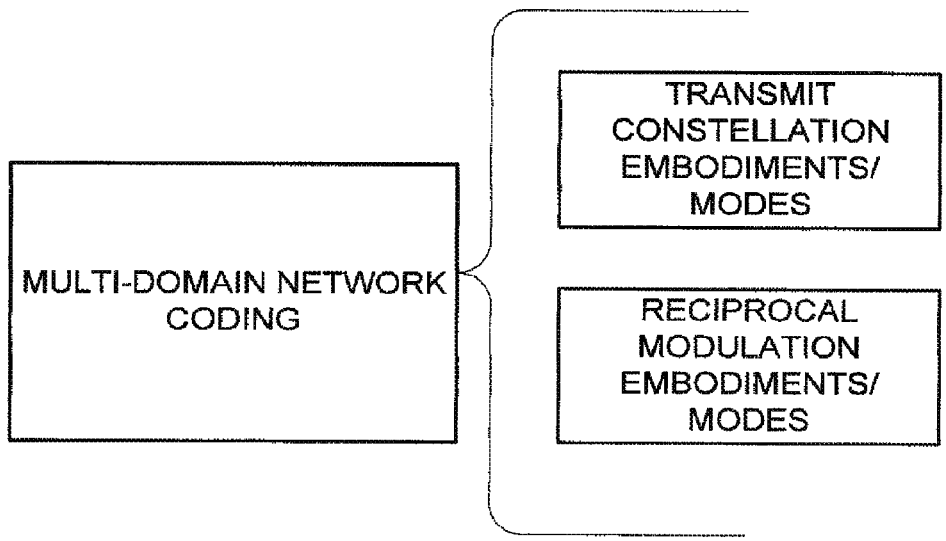
FIG. 3 is a diagrammatic view illustrating that the multi-domain network coding of the technology disclosed herein comprises plural embodiments and modes including constellation mapping embodiments/modes and reciprocal modulation embodiments/modes.

The wireless communication system 20 of FIG. 1 and the method of FIG. 2 generically represent various modes and differing embodiments by which the multi-domain network coding of the technology disclosed herein can be performed. Two example modes/embodiments are described subsequently as non-limiting, more detailed examples, and illustrated in FIG. 3. In a first example mode and embodiment, the network coding is performed with reference to a transmit constellation. In a second example mode and embodiment, the network coding is performed using a reciprocal modulation technique.

2.0 Constellation Mapping Embodiments/Modes

In some of its aspects and in some of its embodiments (the "constellation mapping" modes/embodiments), the technology described below provides new transmit constellations when transmitting a network-encoded signal, and thus does so instead of using conventional constellations like BPSK constellation, 16QAM constellation, etc. The new constellations are formed based on the modulation schemes of the distinct signals forming the network-coded signal. This makes it possible to perform multiplicative network coding on signals that are modulated with modulation schemes containing information in the phase domain and also in the amplitude domain. The ensuing detailed description explains how the constellations are constructed and used at the receiver (e.g., at network decoding node 26) in order to decode the received network-coded signal.

As mentioned above, the technology described enables the performance of multiplicative network coding on signals using modulation schemes that have information carried in the phase domain and also possibly in the amplitude domain. Examples of such modulation schemes include QAM modulation with an order above 4 (i.e., 16QAM, 64QAM, and so forth). In order to do so, new transmit constellations are used that depend on the modulation schemes of the distinct signals forming the network-coded signal. The network-coded symbol or signal is mapped to the corresponding symbol in the corresponding transmit constellation and then transmitted.

The constellation mapping embodiments and modes encompass topologies where the receiver (e.g., network decoding node 26) has the distinct signals needed in order to perform network-decoding. For example, if the network-coded signal includes two distinct signals (the first signal and the second signal), then the receiver (e.g., network decoding node 26) needs to possess one of these distinct signals (e.g., the first signal) in order to be able to perform network-decoding and obtain the other distinct signal (e.g., the second signal, the signal that is intended to network decoding node 26). The information (i.e., the distinct signal(s) already present at the receiver) can be, for example, either previously transmitted by the receiver and/or overheard/received from other transmissions, and hence previously stored.

Thus, in the constellation mapping modes and embodiments, an indication of the transmit constellation is transmitted and used (i.e. the constellation used to perform network coding). So in case the network coded data entities have were modulated with QPSK and 16QAM, an indication e.g. QPSK_16QAM will be sent to the receiving nodes so that they can perform proper network decoding. However, it is assumed that each node knows the modulation used to modulate the data entities prior to network coding. This is a reasonable assumption in essentially all communication systems. One example is cellular systems using FDD when the mobile station would inform the base station of the quality of the downlink transmission (i.e. the transmission from the base station to the mobile station), and based on this information the base station will use appropriate modulation (and coding) to send data to the mobile station. Knowing this information, and in conjunction with the transmit constellation indication, the mobile station can deduce the modulation of the other data entity. All or part of this information may be used in order to perform network decoding of the network coded signal and demodulate the desired data entity (i.e. obtain soft or hard estimates of the desired data entity).

As an example, assume the network coding node wants to transmit first signal s1 to user U1 (who already has second signal s2) and second signal s2 to user U2 (who already has first signal s1). In order to decide the modulation to be used on s1 and s2, the network coding node can. e.g., instruct U1 (respectively U2) to measure the channel quality from the network coding node to U1 (respectively U2) in order to choose modulation (and coding) based on this quality. U1 and U2 would, based on the measured quality, report that modulations of order QPSK and 16QAM are preferable, respectively. As a result, the network coding node would modulate s1 with QPSK and s2 with 16QAM prior to network coding. User U1 knows the modulation order used for s1 and that for the transmit constellation, so it can deduce that of s2 (which is needed in order to perform network decoding). With all (or part of) this information, obtaining an estimate of the desired data entity in either hard or soft format is now possible.

2.1 Formation of Transmit Constellations

Now following are non-limiting examples that explain how the proposed transmit constellations are formed, how the receiver performs the network decoding (e.g., signal demapping) operation, and advantages and implications of using the constellation mapping technology disclosed herein. While the examples use network-coded signals with two distinct signals (e.g., the first signal and the second signal), network-coded signals which use more than two distinct signals are encompassed herein and are understood to be straightforward extensions of the technology illustrated and discussed, requiring, e.g., change in the feedback and the design of the transmit constellations.

In general, the transmit constellations of the technology disclosed herein are formed by multiplying every symbol from the constellation of the first distinct signal (i.e. the first distinct constellation) with every symbol from the constellation of the second distinct signal (i.e. the second distinct constellation) so as to account for every possible multiplicative network-coding instance. In other words, the resultant transmit constellation is the result of a symbol-wise multiplication of the first distinct constellation with the second distinct constellation.

2.1.1 Constellation Mapping Example 1

Figure 4:
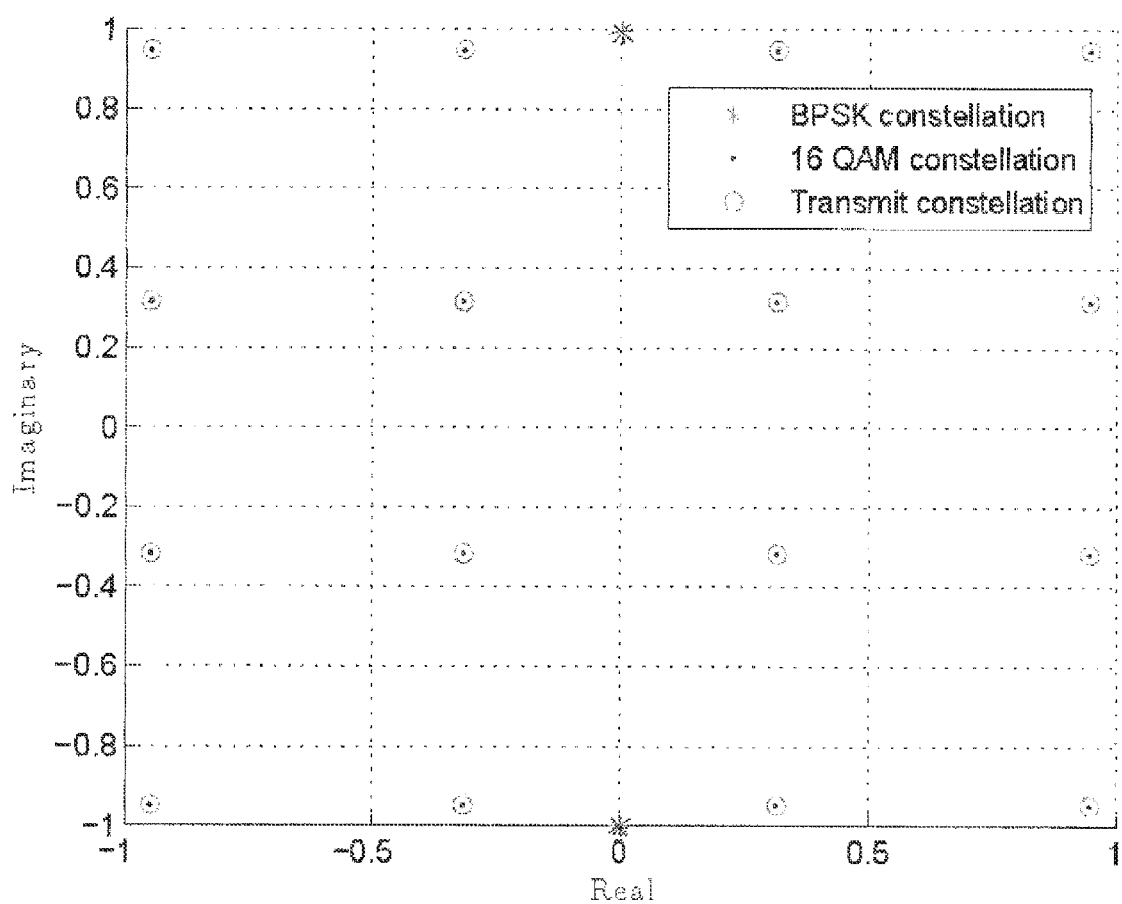
FIG. 4 through FIG. 7 are graphs showing normalized constellations of transmit constellations according to differing examples and the respective distinct constellations from which the transmit constellations are derived.

The first example illustrative constellation mapping is 16QAM network-coded with BPSK. For example, one distinct signal (e.g., the first signal) uses a 16QAM modulation while the other distinct signal (e.g., second signal) uses a BPSK modulation. The resultant transmit constellation is the result of a symbol-wise multiplication of the first distinct constellation (i.e. the 16QAM constellation) with the second distinct constellation (i.e. the BPSK constellation). The resulting points then result in the new transmit constellation to be used when transmitting the network-coded signal as shown in FIG. 4. Notice here since once of the composite signals has a BPSK constellation, the resultant transmit constellation will be the same as the constellation of the other signal to be network coded. However, when none of the signals is BPSK and at least one of them has information in both the phase and amplitude domains, the transmit constellation will be different from both distinct constellations.

In conjunction with FIG. 4, assume the node performing the network-coding operation (e.g., network coding node 24) wants to transmit the two distinct symbols $s1=(1-j)/\text{sqrt}(10)$ from the 16QAM constellation and $s2=j$ from the BPSK constellation. The network-coded signal would then map into symbol $s=(1+j)/\text{sqrt}(10)$ from the transmit constellation, which is consequently transmitted.

It is possible that the network coding of different distinct signals will give the same network-coded signal, that is, the input-to-output mapping is not unique. For example, if the first signal $s1=(1-j)/\text{sqrt}(10)$ is network encoded with the second signal $s2=j$, the output symbol would be $s=(1+j)/\text{sqrt}(10)$. A similar output symbol would be obtained if $s1=(-1+j)/\text{sqrt}(10)$ is network encoded with $s2=-j$. This issue is addressed later below.

The receiving node (e.g., network decoding node 26) knows two entities needed to perform the network-decoding operation: (1) one of the two distinct signals forming the network-coded signal, and (2) the transmit constellation used. Assume, for example, that a user U1 knows the second signal s2 and would like to extract the first signal s1 and that a user U2 knows the first signal s1 and would like to extract the second signal s2. Using its knowledge of the second distinct signal and of the transmit constellation used, user U1 can perform network-decoding by mapping the received signal $r1=h1s+n1$ into the constellation of the distinct signal user U1 wants to receive, i.e. the constellation of the first signal (which is 16 QAM). The mapping is done by compensating for the phase and amplitude of the second signal (which are already known by user U1). As a result, user U1 will see the first signal as if it were transmitted using its own distinct constellation (i.e. 16 QAM), impaired by fading and noise, and as if no network-coding operation took place. Subsequently, the receiver can proceed with decoding the distinct signal that was intended to it as if the network-encoding operation did not take place. Consequently, the mapping operation simply allows the receiver to discard or ignore the change in the amplitude and phase of the network-coded signal due to the multiplicative network coding (MNC) operation, i.e., when multiplying signals using different modulation orders and consequently possessing different amplitudes.

In effect, the transmit constellation is transparent to the conventional decoding procedure (e.g., transparent to the decoding of the underlying modulated signal which occurs after decoding for the network coding), and it enables the operation of multiplicative network coding on signals modulated with modulation schemes that contain information in the phase domain and also in the amplitude domain.

2.1.2 Transmit Constellation Example 2

The second example illustrative transmit constellation is 16QAM network-coded with 4QAM. In this second example the distinct signals are modulated using 16QAM and 4QAM. The distinct constellations, in addition to the resultant transmit constellation, are shown in FIG. 5.

Figure 5:
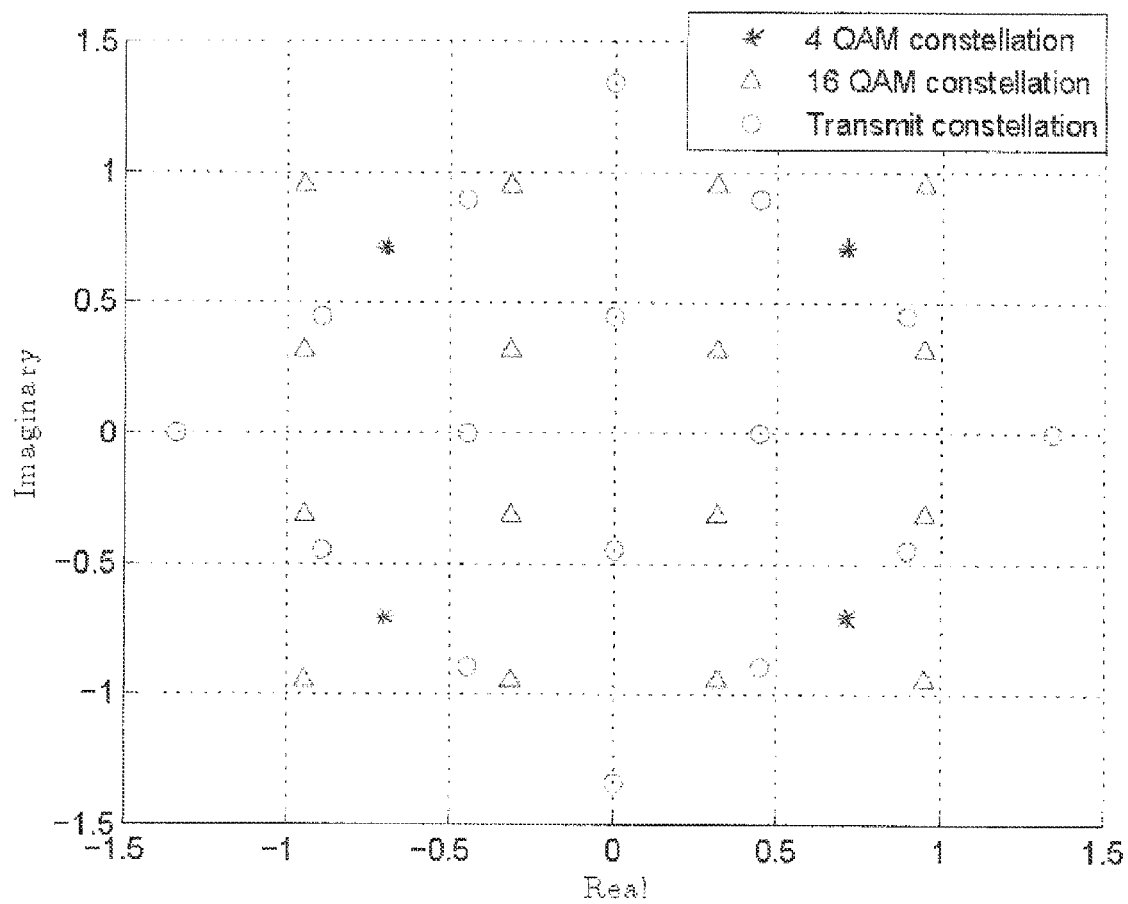

As understood from FIG. 5, when neither of the distinct signals uses a BPSK modulation, the resultant transmit constellation will have a different shape than any of the distinct constellations. Furthermore, the decoding operation is as explained previously. The receiving node makes use of the distinct signal it has in addition to the used transmit constellation in order to perform network-decoding prior to decoding the distinct signal that was intended to it.

2.1.3 Transmit Constellation Example 3

Figure 6:
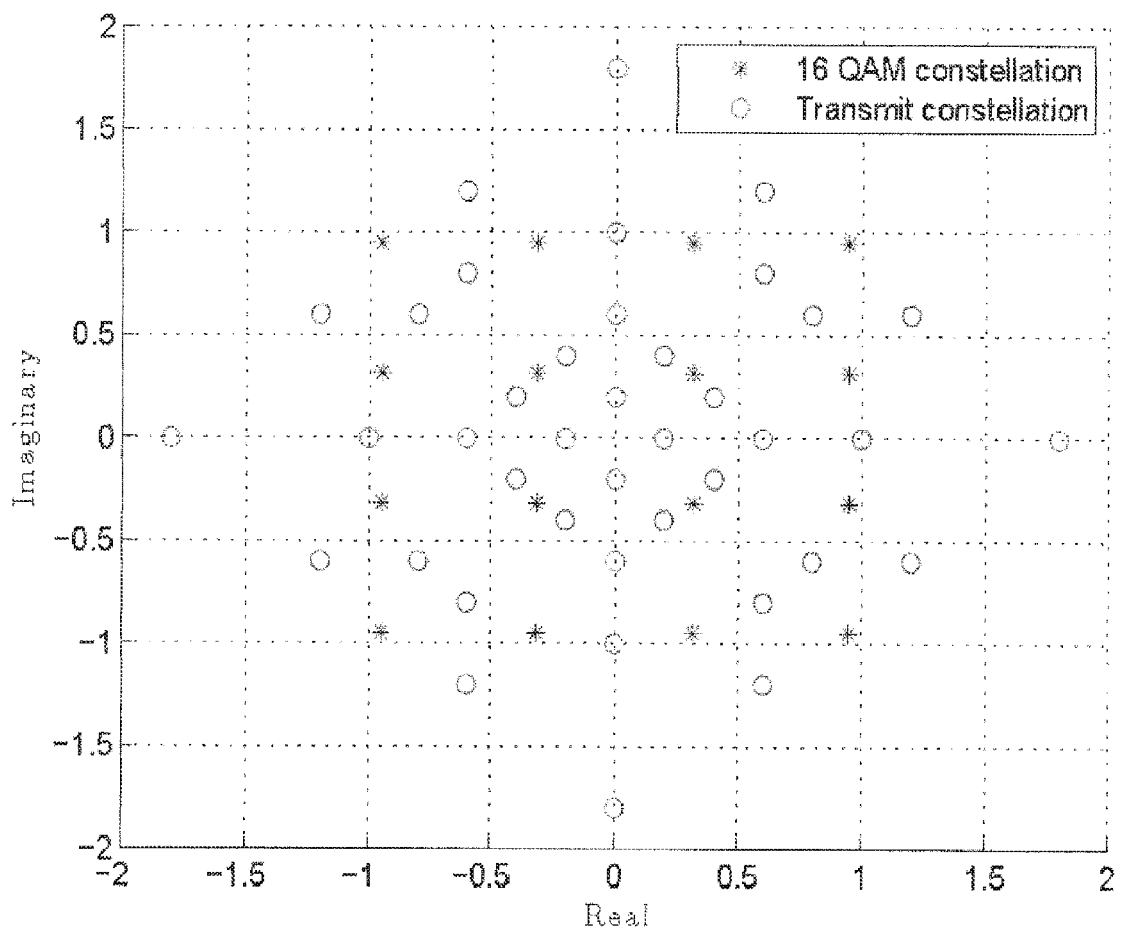

The second example illustrative transmit constellation is 16QAM network-coded with 16QAM. In this third both of the distinct signals are modulated using 16QAM. The distinct constellation and the resultant constellation are shown in FIG. 6. The decoding operation is as explained previously. The receiving node makes use of the distinct signal it has in addition to the used transmit constellation in order to perform network-decoding prior to decoding the distinct signal that was intended to it.

2.1.4 Constellation Mapping: Compatibility

Figure 7:
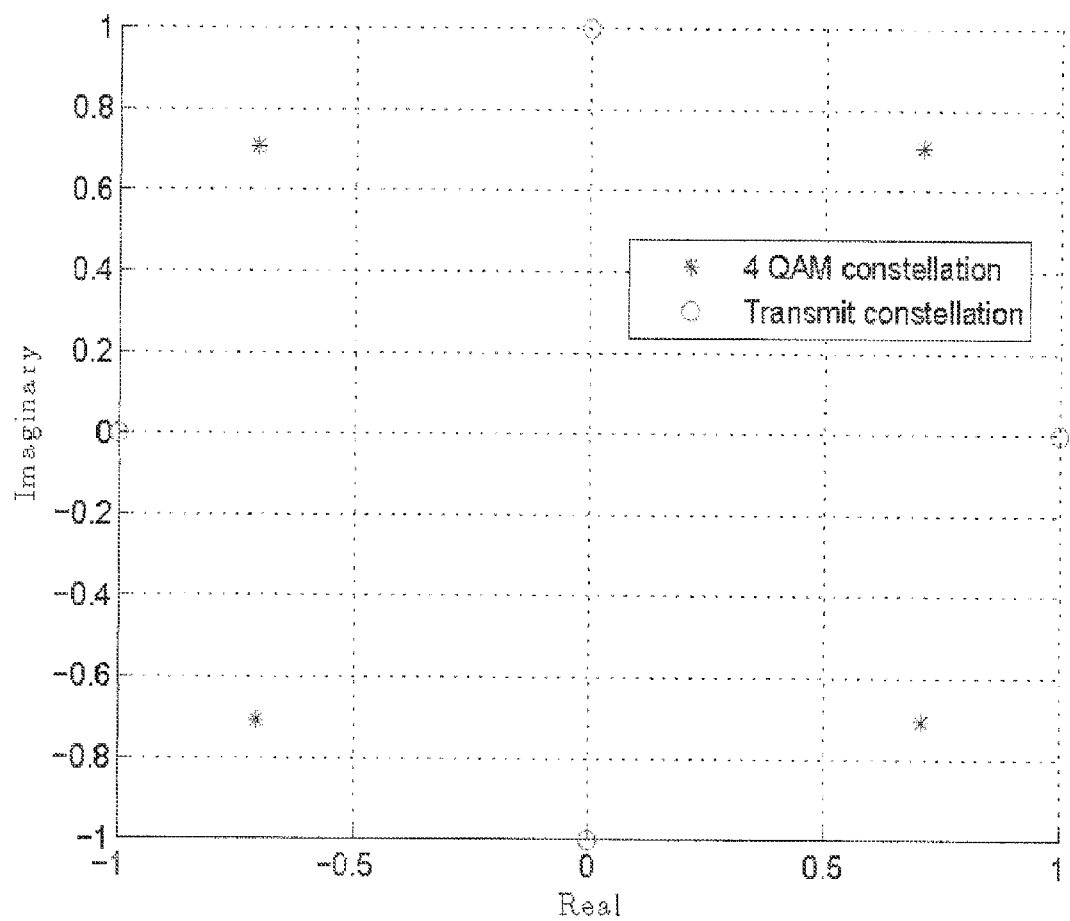

Formation of the transmit constellations utilized by the technology disclosed herein provides advantages over the technology of PCT/SE2008/050861 in providing network coding for distinct signals containing information in both the phase domain and the amplitude domain. Yet the technology disclosed herein and particularly the transmit constellation formation is consistent with and accommodates the technology of PCT/SE2008/050861. Indeed, the technology of PCT/SE2008/050861 can be seen as a special case where both of the distinct signals use a modulation scheme that contains the information in the phase domain. For instance, if both distinct signals use a 4QAM constellation, one can generate the transmit constellation shown in FIG. 7 and use the proposed method of the technology disclosed herein for transmission and network-decoding. Thus, the multi-domain network coding unit 40 and multi-domain network decoding unit 50 of the technology disclosed herein can be utilized both for multi-domain network coding and single domain network coding.

2.2 Constellation Mapping: Node Architectures

Figure 8:
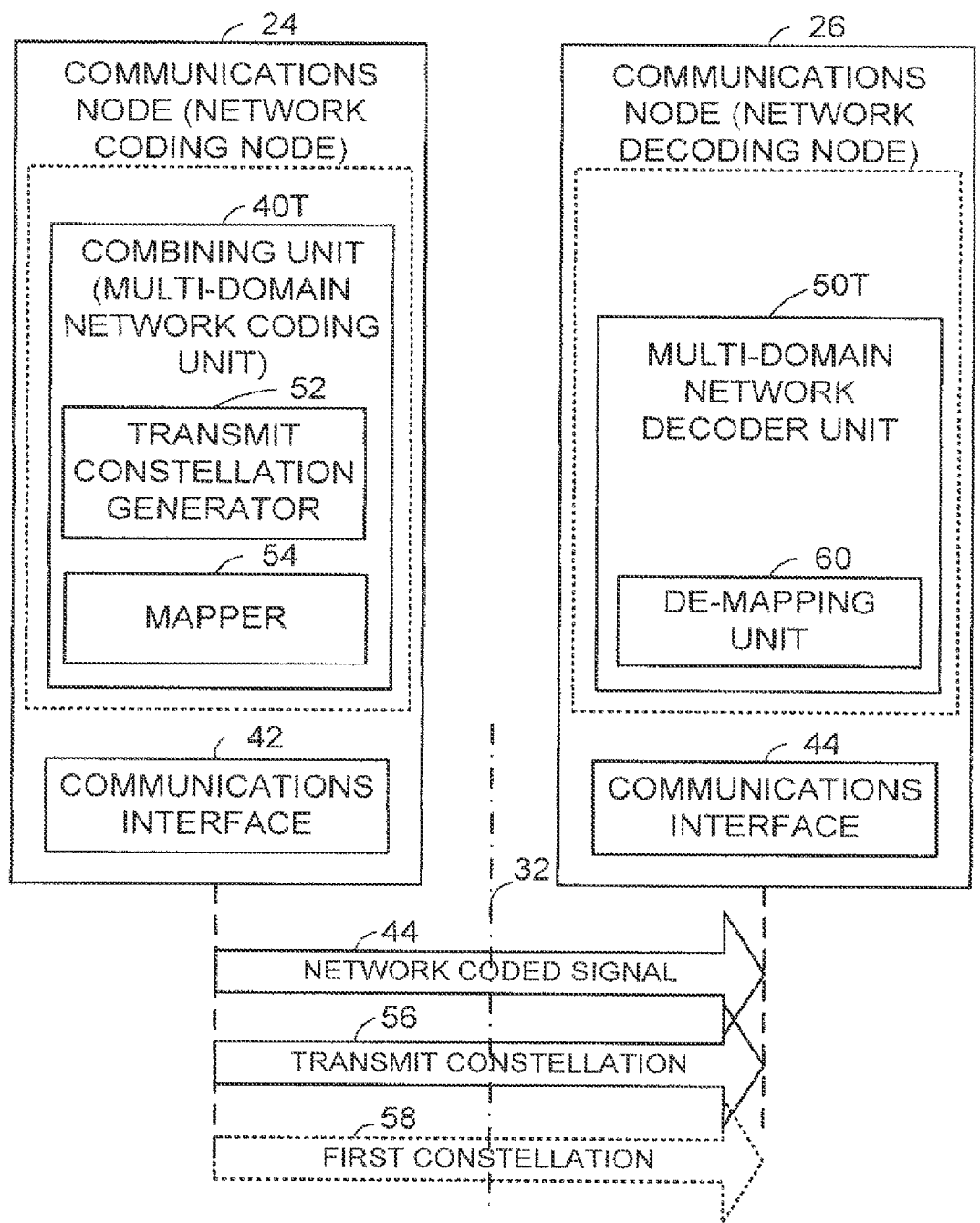
FIG. 8 is a diagrammatic view of portions of wireless communication system including a network coding node and a network decoding node and suited for multi-domain network coding according to constellation mapping modes and embodiments.

FIG. 8 illustrates example general architecture of network coding node 24 and network decoding node 26 for the constellation mapping modes and embodiments. For the constellation mapping modes and embodiments, the multi-domain network coding unit 40T comprises transmit constellation generator 52 and mapping unit 54.

The transmit constellation generator 52 is configured to use the first constellation of the first modulation scheme of the first signal and the second constellation of the second modulation scheme of the second signal to obtain the transmit constellation, in a manner understood from the previous discussion and FIG. 4 through FIG. 7 in particular. In an example embodiment, the transmit constellation generator 52 is configured to obtain the transmit constellation by multiplying every symbol of the first constellation by every symbol of the second constellation. Thus, the transmit constellation is in general different from the first constellation and the second constellation.

The mapping unit 54 is configured to map the network coded signal into the transmit constellation. For the transmit constellation embodiment the communications interface 42 is configured not only to transmit the network coded signal to network decoding node 26, but also to transmit to network decoding node 26 an indication of the transmit constellation. Transmission of the indication of the transmit constellation is depicted by arrow 56 in FIG. 8. An "indication" of a constellation can take the form of an identifier of the constellation, the identifier being understood by both network coding node 24 and network decoding node 26.

As shown in FIG. 8 the multi-domain network decoding unit 50T of the constellation mapping mode and embodiment comprises a de-mapper or de-mapping unit 60. The de-mapping unit 60 is configured to de-map the network coded symbol from the transmit constellation to the second constellation by compensating the network coded symbol for phase and amplitude of the first signal.

2.3 Constellation Mapping: General Operation

Figure 9:
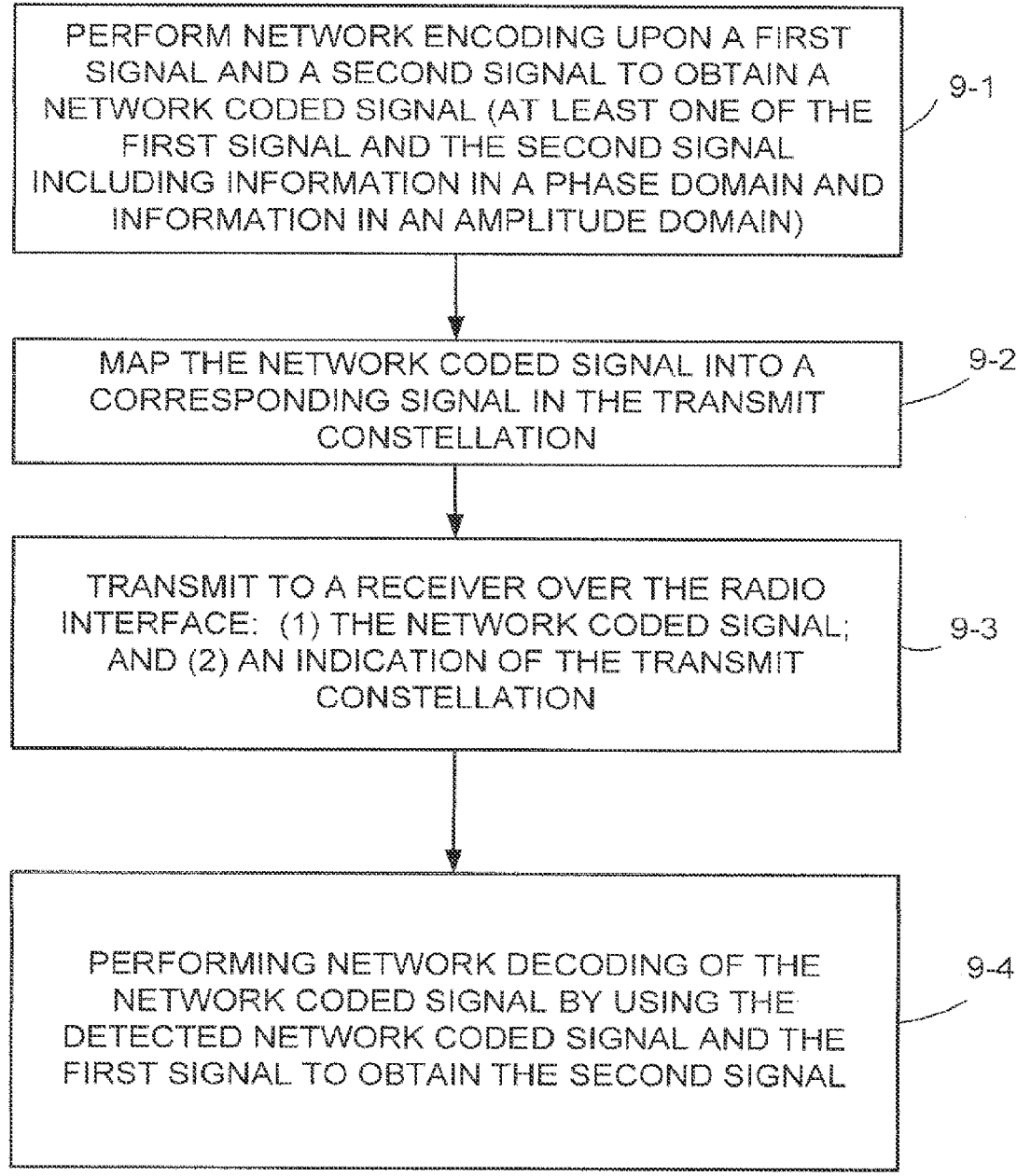
FIG. 9 is a flowchart illustrating basic, representative acts or steps performed by the wireless communication system of FIG. 8 in conjunction with network coding according to the constellation mapping mode and embodiment generally.

FIG. 9 illustrates basic, representative acts or steps performed by the wireless communication system 20 of FIG. 8 in conjunction with network coding according to the constellation mapping mode and embodiment generally. Act 9-1 comprises performing (at network coding node 24) network coding upon a first signal and a second signal to obtain a network coded signal. As previously explained, at least one of the first signal and the second signal includes information in a phase domain and information in an amplitude domain. Act 9-2 comprises mapping the network coded signal into a corresponding signal in the transmit constellation. Act 9-3 comprises transmitting (to a receiver such as network decoding node 26 and over interface 32) the following: (1) the network coded signal (as indicated by arrow 44 in FIG. 8), and (2) an indication of the transmit constellation (as indicated by arrow 56 in FIG. 8). Act 9-4 comprises, at the receiver (e.g., network decoding node 26), using the detected network coded signal, the first signal, and the transmit constellation to obtain the second signal.

Thus, to perform the decoding of the network coded signal the network decoding node 26 uses the first signal and the transmit constellation to obtain the second signal. After a network-decoded version of the second signal is obtained as act 9-4, as a further act the network decoding node 26 typically performs a conventional demodulation of the second signal. To perform the conventional demodulation of the second signal, which is a distinct operation from the network decoding, the network decoding node 26 generally also needs an indication of the first constellation. The indication of the first constellation can be transmitted separately from transmission of the indication of the transmit constellation (such transmission of the indication of the first constellation being indicated by broken line arrow 58 in FIG. 8). Thus, the network coding per se of the technology disclosed herein is transparent to the conventional modulation that takes place on the distinct signals/data entities before network coding and also transparent to the conventional demodulation that takes place on the symbol(s) after network decoding. The role of the network decoding operation is to simply decouple the two network coded symbols so that each conventional demodulator would have as input its desired symbol, distorted by fading and/or noise. Moreover, the effects of noise and/or fading are not introduced by the network coding of the technology disclosed herein (in a noise and fading free system, the network decoding is able to correctly retrieve the exact symbols used for network coding), and can be dealt with by the conventional demodulation.

As explained above, in an example implementation of the constellation mapping technique, the detected network coded signal represents a network coded symbol mapped into the transmit constellation. As shown by FIG. 10, the act of using the network coded signal to obtain the second signal can comprise de-mapping the network coded symbol from the transmit constellation to the second constellation by compensating the network coded symbol for phase and amplitude of the first signal.

2.4 Constellation Mapping: Mapping & Demapping

Now provided is a discussion of two example illustrations or techniques of "compensating" the network coded symbol for phase and amplitude of the first signal. In a first example implementation, illustrated with reference to FIG. 11A, the first signal is used to de-map the network coded symbol from the transmit constellation to the at least one candidate(s) of the estimate of the second signal by first compensating for amplitude (e.g., amplitude normalization) and then compensating for phase. In a second example implementation, illustrated by FIG. 11B, the act of using the first signal to de-map the network coded symbol from the transmit constellation to the at least one candidate(s) of the estimate of the second signal comprises first compensating for phase before compensating for amplitude in the constellation demapping.

2.4.1 Constellation Demapping: Amplitude Normalization Before Phase Compensation Act 11-1 of the compensating process comprises using the first signal to de-map the network coded symbol from the transmit constellation to at least one candidate(s) of an estimate of the second signal on the second constellation. Act 11-1 is thus an amplitude compensation (e.g., amplitude normalization) which results (graphically) as a circle of a certain amplitude. Act 11-2 comprises, when there is more than one candidate of the estimate of the second signal, continuing the de-mapping by performing phase compensation to determine a correct estimate of the second signal from among the at least candidate(s). In other words, act 11-2 results in selecting a specific point on the circle obtained after act 11-1, e.g., the circle obtained after amplitude compensation.

To explain and illustrate further the foregoing, assume the network coding node (e.g., network coding node 24) wants to encode a first signal $s1=(1-j)/\sqrt{10}$ from a 16QAM modulation with a second signal $s2=j$ from a BPSK modulation. The sqrt(10) normalization comes from the 16QAM normalization: its purpose is to obtain an average unit energy of the symbols of a given constellation (which is the 16QAM constellation in that case), as is well known to a person skilled in the art. The result will be mapped into point $s3=(1+j)/\sqrt{10}$ in the network coding constellation, as shown in FIG. 12. In FIG. 12, the solid darkened circle represents s3, and the constellation is that of encoding a BPSK symbol with a 16QAM symbol. In FIG. 12, "Re" corresponds to the real part axis while "Im" corresponds to the imaginary part axis.

FIG. 12 supposes that user U1 already possesses $(1-j)/\sqrt{10}$ and would like to obtain the second signal $s2=j$ (and that user U2 possesses the second signal s2 and would like to obtain the first signal s1). For the sake of clarity FIG. 12 further assumes that user U1 receives the network coded signal s3 impaired by fading which can be removed at the receiver of user U1 through, e.g., knowledge of the channel. FIG. 12 yet further assumes that the noise is equal to 0 (issues of noise and normalization of the symbols after network coding are discussed subsequently). User U1 now has knowledge of the first signal s1 (which it has transmitted previously) and the network coded signal s3 (which it has received after the transmission of the network coding node) which has been detected using the network coding constellation. It is assumed that user U1 knows which network coding constellation was used at the network coding node. The task is now to map the network coded signal s3 from the network coding constellation (from FIG. 12) into a suitable constellation to demodulate the second signal s2.

Figure 13:
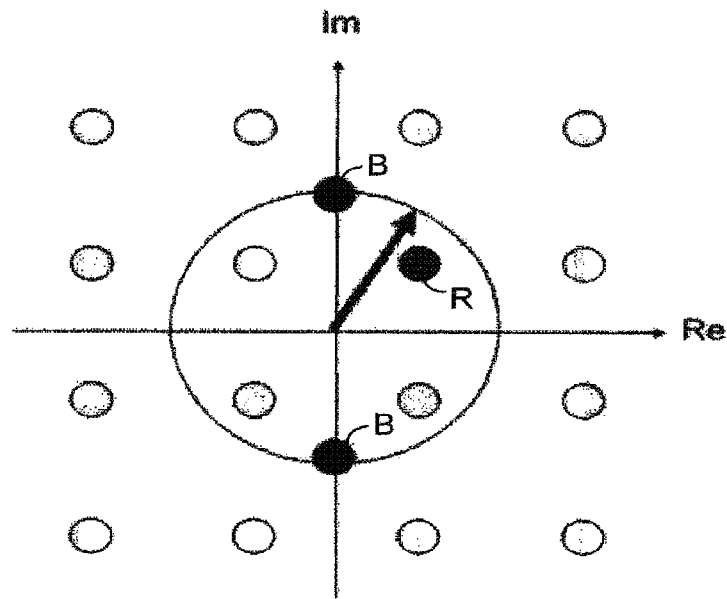
FIG. 13 is a graph showing normalization of amplitude of a detected network coded signal by amplitude of a first signal resulting in a circle.

As already mentioned, user U1 received the network-coded signal s3 and knows the constellation used for performing network coding. Next, user U1 makes use of the first signal s1=(1−j)/sqrt(10) in order to map the network coded signal s3 from the network coding constellation to an estimate of the second signal s2 on the constellation of the second signal s2 (Act 11-1 of FIG. 11A). This is done by first accounting for the amplitude of the first signal s1 by normalizing the amplitude of the detected network coded signal s3 by the amplitude of the first signal s1. This will result in an amplitude of 1 (since both the first signal s1 and the network coded signal s3 have the same amplitude) which is the equivalent of a circle with a radius of amplitude 1 in the constellation space, as illustrated in FIG. 13. In FIG. 13, the arrow points to the circle of radius of amplitude 1. In FIG. 13, the solid, darkened circle R within the circle of radius of amplitude 1 represents the network coded signal s3, while the solid, darkened circles B lying on the arrow pointed-to circle (of radius of amplitude 1) represent the different possible output alternatives for the symbol of the second signal s2 once amplitude compensation has been performed on the network coded signal s3. Since the other symbol has a BPSK modulation, as shown in FIG. 13 this will result in two different possibilities to estimate the second signal s2, which two different possibilities are shown by the black dots on the amplitude radius circle of FIG. 13.

Figure 14:
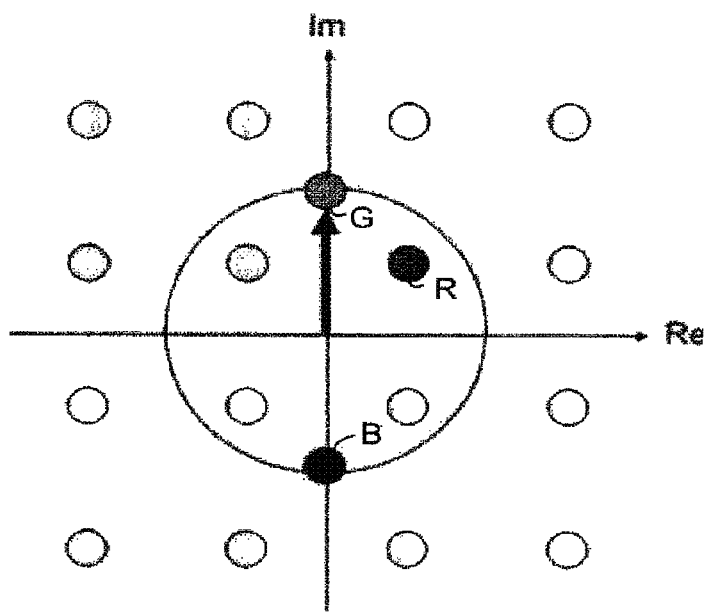
FIG. 14 is a graph showing results of a phase compensation operation to ascertain a correct one of plural possible symbol estimates.

By performing phase compensation, the correct estimate from the two estimates of FIG. 13 can be obtained. Performing phase compensation (depicted by act 11-2 in FIG. 11A) comprises the acts of subtracting the phase of the first signal s1 (−45 degrees) from the phase of the estimated network coded signal s3 (+45 degrees), thus resulting in a phase of 90 degrees as shown in FIG. 14. Thus, the correct symbol obtained by phase compensation is the symbol corresponding to the darkened circle G to which the arrow points in FIG. 14.

Thus, it can be possible that the network-coding of different distinct signals would result in the same network-coded signal. However, knowing one of the two distinct signals and having received the network-coded signal, the mapping to obtain the second distinct signal is unique. The proposed transmit constellations are simply used to perform network-decoding, i.e., to remap the network-coded signal into the distinct signal to be decoded. This means that the actual detection of the distinct signal the receiver wants to decode will be done using the distinct signal's actual constellation. Hence, using these transmit constellations is transparent and enables the performance of multiplicative network coding regardless of which type of modulation has been used.

2.4.2 Constellation Demapping: Phase Accounting Before Amplitude Compensation

As a variation of what has been described above, it is possible alternatively to account for the phase first, and then the amplitude. FIG. 11B specifically shows how the demapping occurs from the constellation used to perform network coding (i.e. constellation mapping) into the constellation used to extract the desired information (i.e. constellation demapping). As explained in more detail below, act 11B-1 essentially comprises performing a phase compensation (e.g., which results in a certain angle from, e.g., the Re axis). Act 11B-2 comprises performing an amplitude compensation (which results in a specific-length, and thus an end point of the straight line obtained after phase compensation).

Assume the network coding node wants to encode first signal s1=(1−j)/sqrt(10) from a 16QAM modulation with second signal s2=j from a BPSK modulation. The result will be mapped into the point of the network coded signal s3=(1+j)/sqrt(10) in the network coding constellation. This is shown in FIG. 15.

Figure 15:
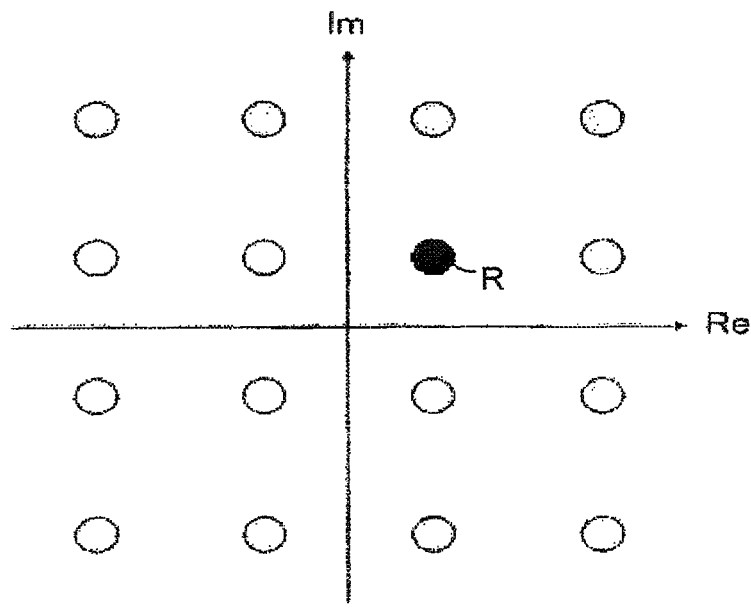
FIG. 15 is a graph showing a network coded signal/symbol in its transmit constellation for the purpose of illustrating network coded and network decoding using the constellation mapping technique.

In FIG. 15, the darkened circle R represents network coded signal s3, and the constellation is that of encoding a BPSK symbol with a 16QAM symbol. The axis Re corresponds to the real part axis while the axis Im corresponds to the imaginary part axis.

Suppose that user U2 already possesses second signal s2=j and would like to obtain first signal s1=(1−j)/sqrt(10) (and user U1 possesses first signal s1 and would like to obtain second signal s2). For the sake of clarity, assume that user U1 receives network coded signal s3 impaired by fading which can be removed at the receiver of user U1 through e.g. knowledge of the channel. Further assume that the noise is equal to 0. User U2 now has knowledge of second signal s2 (which it has transmitted previously) and network coded signal s3 (which it has received after the transmission of the network coding node) which has been detected using the network coding constellation (we assume that user U2 knows which network coding constellation was used at the network coding node). The issue now is how one can map network coded signal s3 from the network coding constellation (from FIG. 15) into a suitable constellation to demodulate first signal s1.

Figure 16:
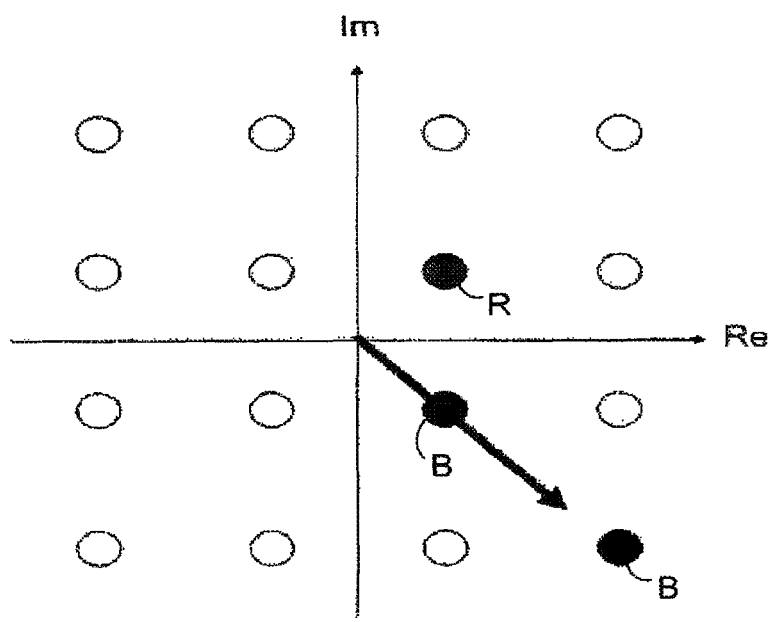
FIG. 16 is a graph showing results of a phase compensation operation resulting in a line.

As already mentioned, user U2 received the network coded signal s3 and knows the constellation used for performing network coding. Next, user U1 makes use of second signal s2=j in order to map network coded signal s3 from the network coding constellation to an estimate of first signal s1 on the constellation of first signal s1. As reflected by act 11B-1 of FIG. 11B, this is done by first accounting for the phase of second signal s2. The phase of first signal s1 is obtained by subtracting the phase of second signal s2 from the phase of the network coded signal s3, thus resulting in a phase of (−45 degrees) for first signal s1 (i.e. 45-90). This is the equivalent of a line originating from the center of the constellation at an angle of (−45 degrees) from the Re axis as shown in FIG. 16. In FIG. 16, the dark circle R represents the network coded signal s3, the other dark circles B represent the different possible output alternatives for the symbol of first signal s1 once phase compensation has been done performed on the network coded signal s3.

Figure 17:
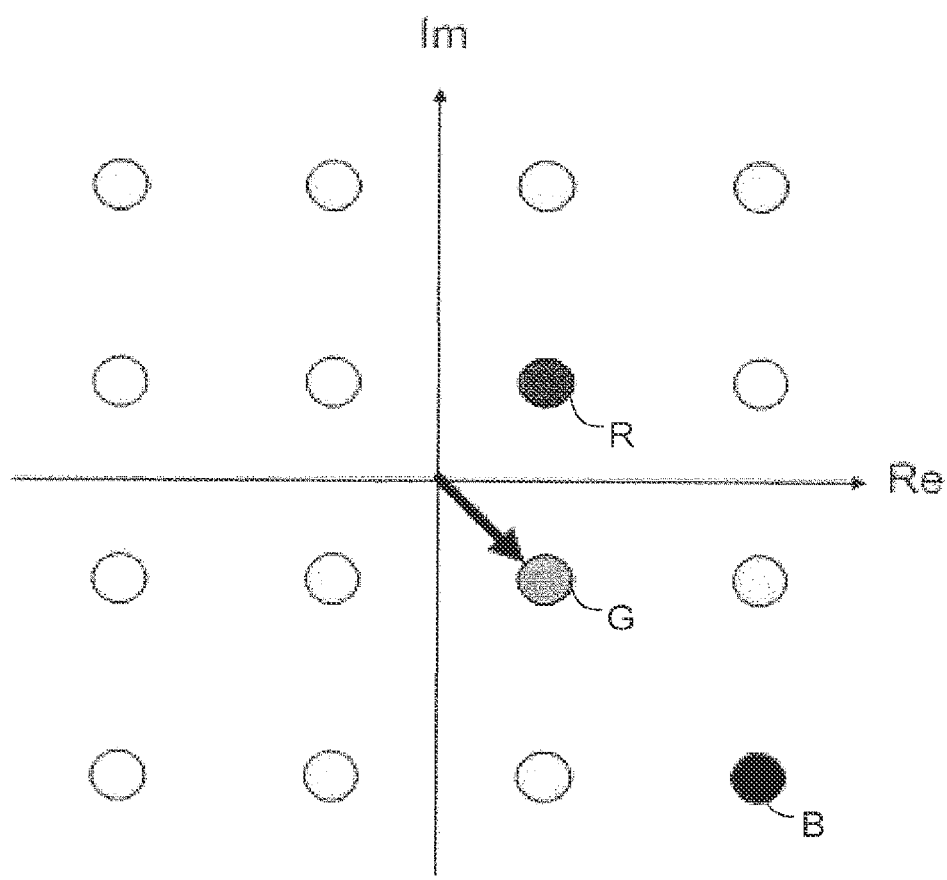
FIG. 17 is a graph showing results of an amplitude compensation operation to ascertain a correct one of plural possible symbol estimates.

Since first signal s1 has a 16QAM modulation (assuming that either user U2 knows this before hand, or it has been informed about this by the network coding node or any other node), this will result in two different possibilities to estimate the first signal s1 which are given by the black dots (other than circle R) in FIG. 16. By performing amplitude compensation (as reflected by act 11B-2), the correct estimate will be obtained. In an example implementation, act 11B-2 is performed as follows. The amplitude of the estimated network coded signal s3 (i.e. sqrt(2)/sqrt(10)) is divided by the amplitude of the already known second signal s2 (i.e. 1), thus resulting in an amplitude of sqrt(2)/sqrt(10) as shown in FIG. 17. In FIG. 17, the circle G represents the estimated first signal s1 which is equal to '(1−j)/sqrt(10)', the value of first signal s1 that was actually network-encoded.

Thus, with respect to FIG. 8, in various example implementations above described the de-mapping unit 60 is configured to compensate the network coded symbol for phase and amplitude of the first signal in accordance with the acts of FIG. 11A and FIG. 11B as discussed above.

2.5 Constellation Mapping: Signaling

In the constellation mapping embodiments and modes, the combining node (e.g., network coding node 24) informs the end-user(s) (e.g., network decoding node 26) that the end user is about to receive information. When advising the end-user(s) of the anticipated forthcoming transmission, the network coding node 24 can also apprise the network decoding node 26 of which constellations the network decoding node 26 needs to know in order to perform the multi-domain network decoding. In such case, and as illustrated in FIG. 8, the network coding node 24 informs the network decoding node 26 of the transmit constellation (as depicted by arrow 56 in FIG. 8) and the constellation of the first signal (as depicted by arrow 58 in FIG. 8), since knowledge of both of these constellations is needed.

The identities of the constellations can be transmitted from network coding node 24 to network decoding node 26 in any suitable signal or message, either existing or new. In terms of identifier, each constellation can be represented by a pre-arranged convention, such as a predetermined sequence of bits, for example. In any event, this constellation information is signaled prior to network decoding node 26 prior to transmitting the network-coded data (e.g., the network coded signal) to the end user(s) so that the end-user(s) can use the constellations to correctly perform the network decoding operation.

3.0 Reciprocal Modulation Embodiments/Modes

In some of its aspects and in some of its embodiments (the "reciprocal modulation" modes/embodiments), network coding of the technology disclosed herein occurs by reciprocal modulation of the first signal and the second signal to obtain a reciprocally modulated symbol that comprises information in both the phase domain and the amplitude domain.

3.1 Reciprocal Modulation Basic Node Architecture

Figure 18:
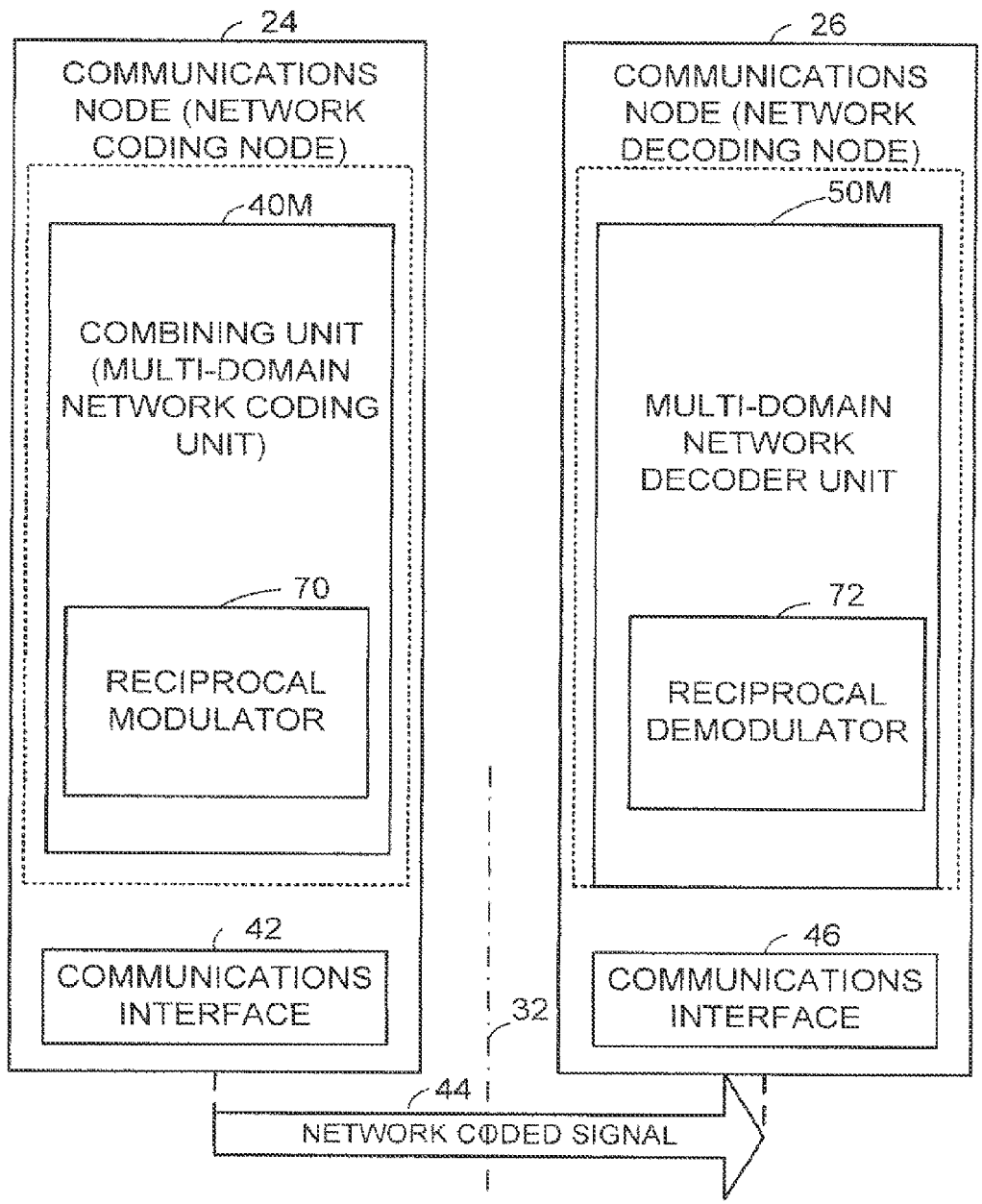
FIG. 18 is a diagrammatic view of portions of wireless communication system including a network coding node and a network decoding node and suited for multi-domain network coding according to reciprocal modulation modes and embodiments.

FIG. 18 illustrates example architecture of a general network coding node 24 and a general network decoding node 26 for the reciprocal modulation modes and embodiments. For the reciprocal modulation modes and embodiments, the multi-domain network coding unit 40M comprises reciprocal modulator 70. The reciprocal modulator 70 is configured to perform the network coding by performing reciprocal modulation of the first signal and the second signal to obtain a reciprocally modulated symbol that comprises information in both the phase domain and the amplitude domain. The multi-domain network decoding unit 50M of network decoding node 26 similarly comprises reciprocal demodulator 72.

3.2 Reciprocal Modulation General Operation

Figure 20:
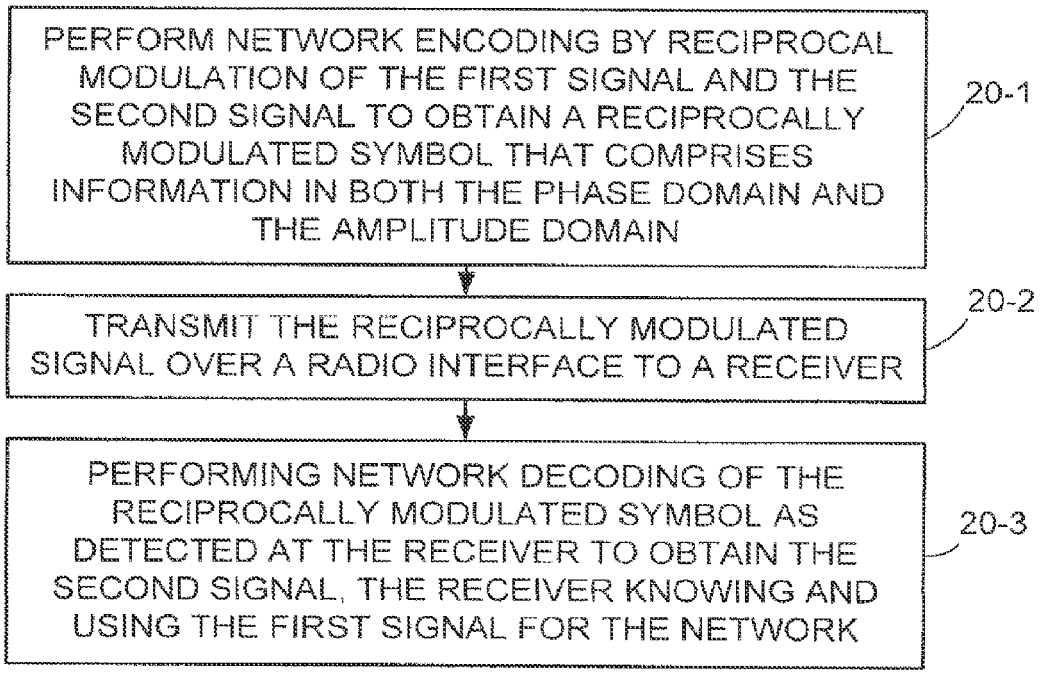
FIG. 20 illustrates basic, representative acts or steps performed by the wireless communication system of FIG. 8 in conjunction with network coding according to the reciprocal modulation mode and embodiment generally.

FIG. 20 illustrates basic, representative acts or steps performed by the wireless communication system 20 of FIG. 8 in conjunction with network coding according to the reciprocal modulation mode and embodiment generally. Act 20-1 of FIG. 20 comprises performing network coding (at network coding node 24) by reciprocal modulation of the first signal and the second signal (by reciprocal modulator 70) to obtain a reciprocally modulated symbol that comprises information in both the phase domain and the amplitude domain. Act 20-2 comprises transmitting the reciprocally modulated signal over interface 32 to a receiver (e.g., network decoding node 26). Act 20-3 comprises performing network decoding of the reciprocally modulated symbol as detected at the receiver to obtain the second signal.

3.3 Reciprocal Modulation Detailed Embodiment

Figure 19:
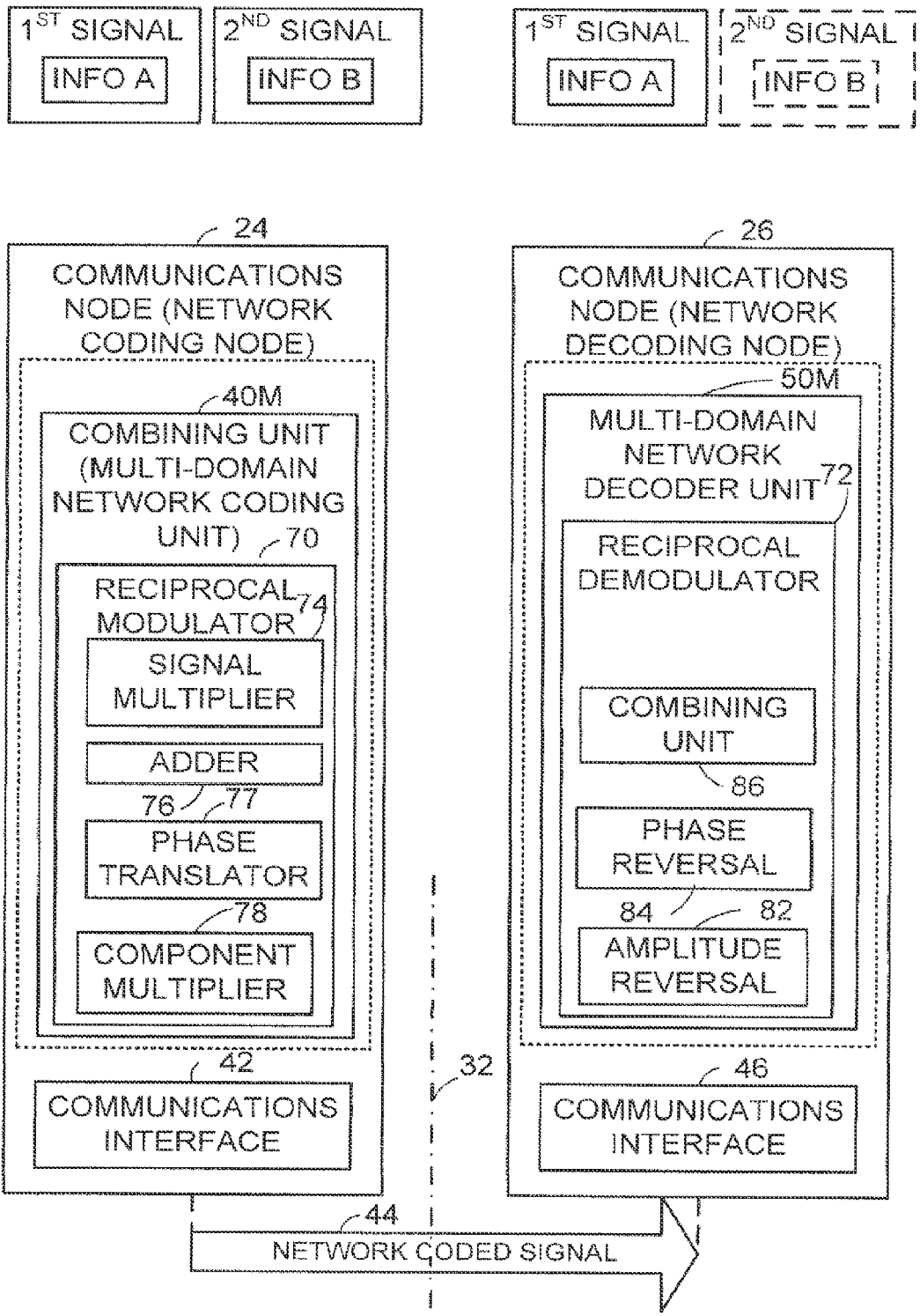
FIG. 19 is a diagrammatic view with more detail of portions of wireless communication system of FIG. 18 in accordance with an example implementation.

In a more detailed but non-limiting example implementation shown in FIG. 19, reciprocal modulator 70 comprises signal multiplier 74; adder 76; phase translator unit 77; and component multiplier 78. The signal multiplier 74 is configured to multiply amplitudes of the first signal and the second signal to form an amplitude component of the reciprocally modulated symbol. The adder 76 is configured to add phases of the first signal and the second signal to form a phase component of the reciprocally modulated symbol. The phase translator unit 77 is configured to translate the phase into a consequent complex value with unit magnitude. The component multiplier 78 is configured to multiply the amplitude component of the reciprocally modulated symbol and the translated phase component of the reciprocally modulated symbol to obtain the reciprocally modulated symbol.

The multi-domain network decoding unit 72 further comprises amplitude removal unit 82; phase removal unit 84; and combining unit 86. The amplitude removal 82 unit is configured to remove an amplitude contribution of the first signal from the reciprocally modulated symbol to obtain an amplitude component of the second signal. The phase removal unit 84 is configured to remove a phase contribution of the first signal from the reciprocally modulated symbol to obtain a phase component of the second signal. The combining unit 86 is configured to combine the amplitude component of the second signal and the phase component of the second signal to obtain the second signal.

Figure 21:
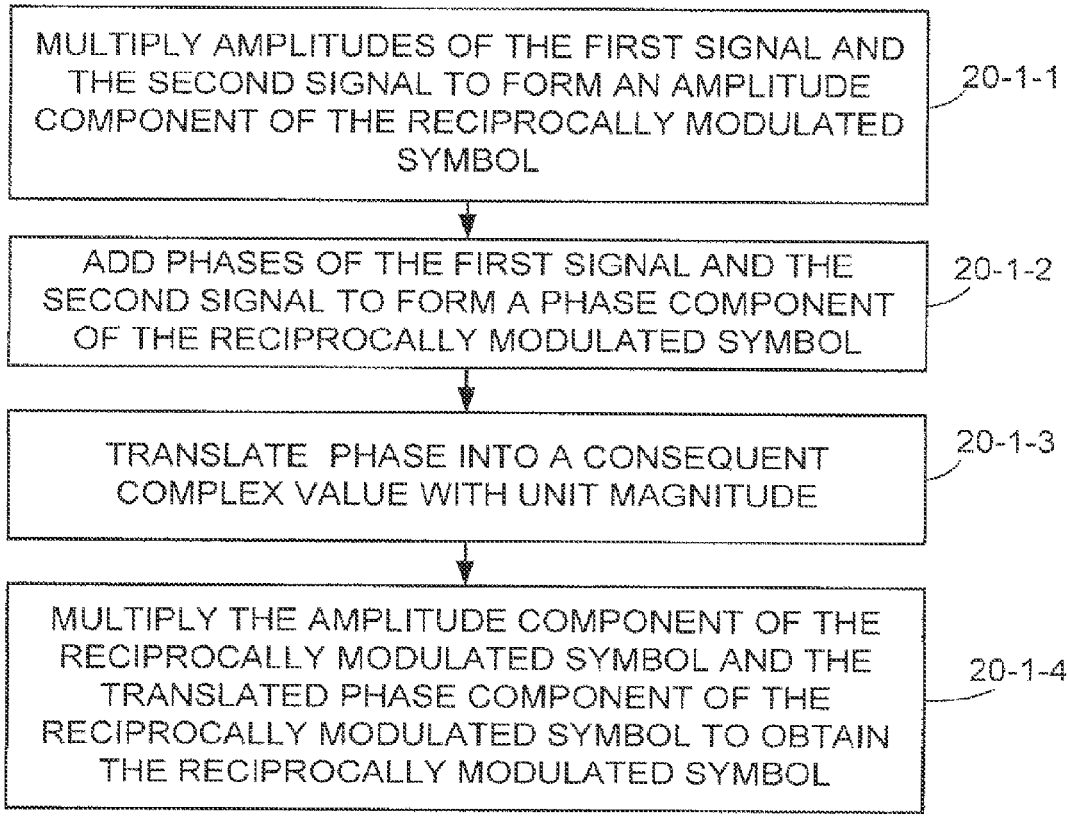
FIG. 21 is a flowchart illustrating basic, representative subacts or substeps in included in an act of FIG. 20.

As indicated above, method of FIG. 20 comprises (as act 20-1) the act of performing network coding (at network coding node 24) by reciprocal modulation of the first signal and the second signal (by reciprocal modulator 70) to obtain a reciprocally modulated symbol that comprises information in both the phase domain and the amplitude domain. The embodiment of FIG. 19 illustrates example constituent components of reciprocal modulator 70 which are suitable for performing act 20-1, and FIG. 21 illustrates example, representative subacts of act 20-1. Act 20-1-1 of FIG. 21 (performed by signal multiplier 74) comprises multiplying amplitudes of the first signal and the second signal to form an amplitude component of the reciprocally modulated symbol. Act 20-1-2 of FIG. 21 (performed by adder 76) comprises adding phases of the first signal and the second signal to form a phase component of the reciprocally modulated symbol. Act 20-1-3 of FIG. 21 (performed by component multiplier 78) comprises multiplying the amplitude component of the reciprocally modulated symbol and the phase component of the reciprocally modulated symbol to obtain the reciprocally modulated symbol.

Figure 22:
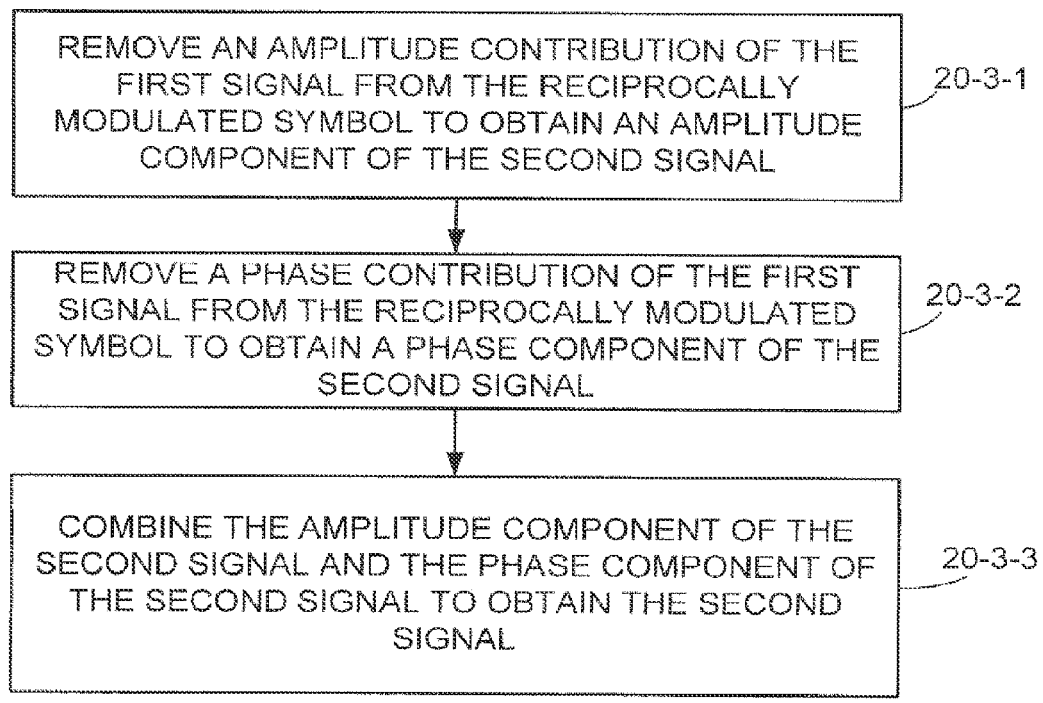
FIG. 22 is a flowchart illustrating basic, representative subacts or substeps in included in another act of FIG. 20.

Act 20-2 of the method of FIG. 20 comprises performing network decoding of the reciprocally modulated symbol as detected at the receiver to obtain the second signal, the receiver knowing and using the first signal for the network. The embodiment of FIG. 19 illustrates example constituent components of reciprocal demodulator 72 which are suitable for performing act 20-3, and FIG. 22 illustrates example, representative subacts of act 20-3. As shown in FIG. 22, act 20-3-1 (performed by amplitude removal unit 82) comprises removing an amplitude contribution of the first signal from the reciprocally modulated symbol to obtain an amplitude component of the second signal. Act 20-3-2 (performed by phase removal unit 84) comprises removing a phase contribution of the first signal from the reciprocally modulated symbol to obtain a phase component of the second signal. Act 20-3-3 (performed by combining unit 86) comprises combining the amplitude component of the second signal and the phase component of the second signal to obtain the second signal. In FIG. 22, acts 20-3-1 and 20-3-2 can be interchanged (essentially as previously described for the case of constellation demapping).

3.4 Reciprocal Modulation Example Coding Scenario

To explain and illustrate further the reciprocal modulation aspects of the foregoing reciprocal modulation embodiment and mode, it is again assumed that the network coding node (e.g., network coding node 24) wants to encode the first signal $s1=(1-j)/sqrt(10)$ from a 16QAM modulation with second signal $s2=j$ from a BPSK modulation. The reciprocal modulation performed by reciprocal modulator 70 of multi-domain network coding unit 40 uses the modulated symbol first signal s1 to modulate the modulated symbol second signal s2 (or vice versa). Since information is generally contained in both the phase and amplitude of the modulated symbols, the reciprocal modulation consists of both an amplitude reciprocal modulation and a phase reciprocal modulation.

Let s3_pre1_amplitude denote the amplitude reciprocally-modulated s2 by s1. In other words, in accordance with act 20-1-1 the multiplier unit 74 performs the multiplication:

$$s3\_pre1\_amplitude = amplitude(s2) * amplitude(s1)$$
$$= 1 * (sqrt(2)/sqrt(10))$$
$$= sqrt(2)/sqrt(10)$$

Act 20-1-2 comprises reciprocally modulating the phase of the second signal s2 by that of the first signal s1. The phase modulation is performed by adder 76, which adds the phase of the first signal s1 to that of the second signal s2 to obtain the phase of the network coded signal s3_pre1_phase:

$$s3\_pre1\_phase = phase(s1) + phase(s2)$$
$$= -45 + 90 \text{(unit is degrees)}$$
$$= 45$$
$$= (1+j)/sqrt(2) [\text{magnitude}=1, \text{phase}=+45 \text{ degrees}]$$

Act 20-1-3 (performed by phase translator unit 77) comprises translating the phase into a consequent complex value with unit magnitude.

Act 20-1-4 comprises component multiplier unit 78 forming the reciprocally modulated symbol s3 from the amplitude and phase components of s3_pre1 as:

$$s3 = s3\_pre1\_amplitude * s3\_pre1\_phase$$
$$= (1+j)/sqrt(10)$$

The reciprocal modulation symbol s3 is thus the same s3 that is obtained from the constellation mapping technique of a previous example.

3.5 Reciprocal Modulation Example Decoding Scenario

The foregoing example scenario is now continued to explain and illustrate further the reciprocal demodulation aspects of the foregoing reciprocal modulation embodiment and mode. It is assumed that user U1 already possesses $(1-j)/sqrt(10)$ and would like to obtain the second signal $s2=j$ (and that user U2 has the second signal s2 and would like to obtain the first signal s1).

The communication interface 46 of network decoding node 26 detects $s3=(1+j)/sqrt(10)$. As act 20-3-1, the user U1 needs to determine the amplitude of the desired second signal s2, which is done by amplitude removal unit 82 removing the amplitude contribution of the already known first signal s1 from the reciprocally modulated s3 as follows:

$$s2\_amplitude = s3\_amplitude/s1\_amplitude$$
$$= (sqrt(2)/sqrt(10))/(sqrt(2)/sqrt(10))$$
$$= 1$$

As act 20-3-2 the phase of the second signal s2 is obtained by the phase removal unit 84 removing the phase contribution of the already known first signal s1 from the reciprocally modulated s3 as follows:

$$s2\_phase = s3\_phase/s1\_phase$$
$$= 45 - (-45)$$
$$= 90 \text{ degrees}$$
$$= j$$

As act 20-3-3 the second signal s2 is obtained by the combining unit 86 combining the amplitude and phase parts as follows:

$$s2 = s2\_amplitude * s2\_phase$$
$$= j$$

Of course, as a variation the phase can be compensated before amplitude without affecting the final result.

It will be understood that essentially the same acts of FIG. 22 and analysis are used to obtain the first signal s1 by user U2.

4.0 Interchangeable Embodiments and Modes

Both methods (constellation mapping and reciprocal modulation) give the exact same final results. This means that these methods can be used interchangeably. In other words, constellation mapping can be employed at the combining node (e.g., network coding node 24) and reciprocal demodulation at the receivers (e.g., network decoding node 26), or reciprocal modulation at the combining node (e.g., network coding node 24) and constellation demapping at the receivers (e.g., network decoding node 26).

5.0 Machine Implmentations

Figure 23:
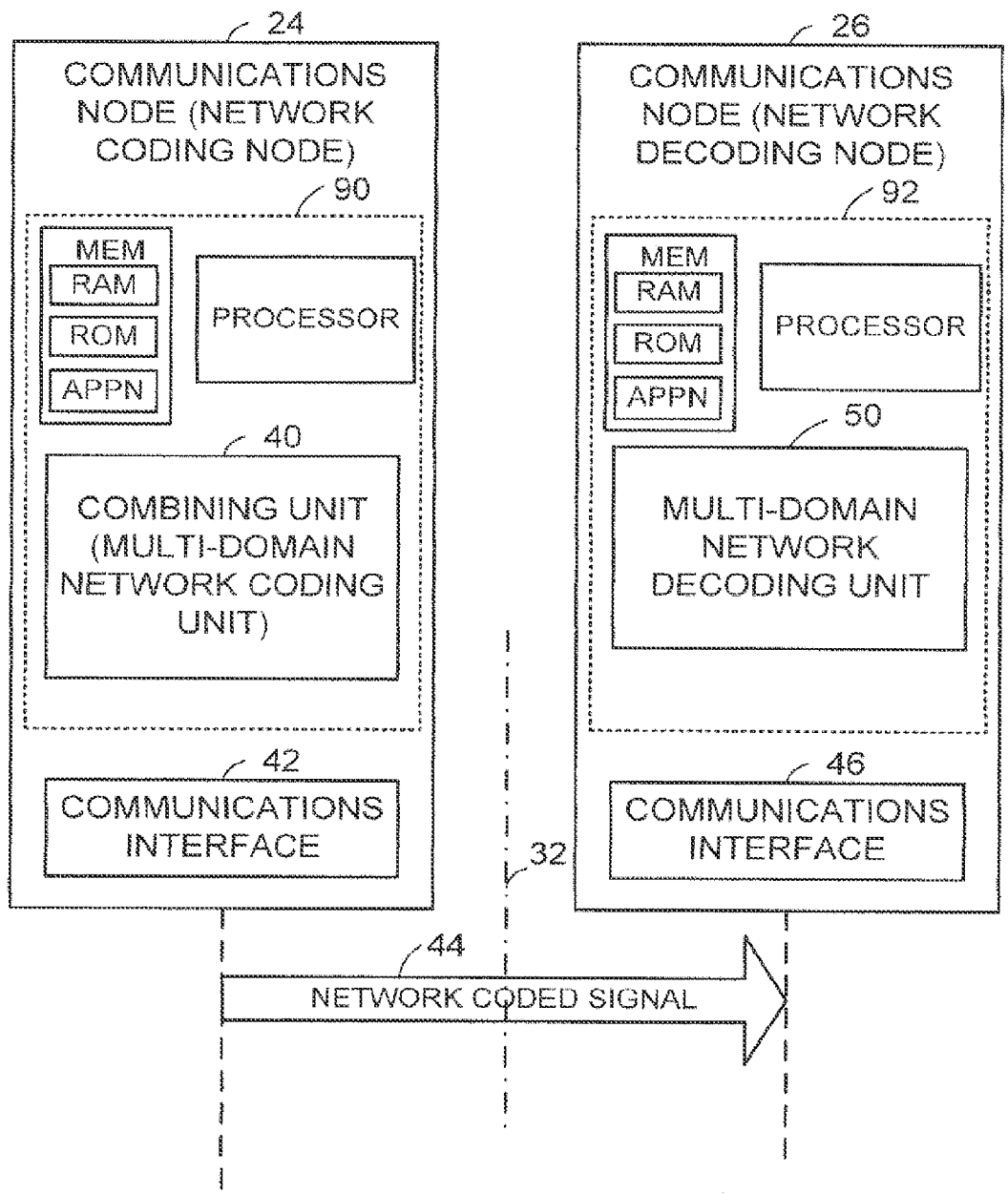
FIG. 23 is a schematic view of an example implementation of system of FIG. 1 wherein at least portions of nodes thereof are hosted on a machine platform.

Various functional units of network coding node 24 and particularly functional units of multi-domain network coding unit 40 can be provided on machine platform 90 which is framed by broken lines in FIG. 23. Likewise, various functional units of network decoding node 26 and particularly functional units of multi-domain network decoding unit 50 can be provided on machine platform 92 which is framed by broken lines in FIG. 23. Comparable broken lines are provided in other figures hereof to illustrate that the embodiments of those figures can also optionally include a similar machine platform for hosting functional units.

The terminology "platform" is a way of describing how various functional units of 40 and multi-domain network decoding unit 50 can be implemented or realized by machine. One example platform is a computer implementation wherein one or more of the framed elements are realized by one or more processors which execute coded instructions in order to perform the various acts described herein. In such a computer implementation each node 24 and 26 can comprise, in addition to a processor(s), memory section MEM (which in turn can comprise random access memory (RAM); read only memory (ROM); application memory (APP) (which stores, e.g., non-transient coded instructions which can be executed by the processor to perform acts described herein); and any other memory such as cache memory, for example). Another example implementation of a machine platform suitable for nodes 24 and 26 is that of a hardware circuit, e.g., an application specific integrated circuit (ASIC) wherein circuit elements are structured and operated to perform the various acts described herein.

6.0 Conventional Demodulation

In accordance with either the reciprocal modulation technique or the constellation mapping technique, in an example implementation the method further comprises demodulating the second signal (after the second signal has been demodulated from the network coding) according to the second modulation scheme.

7.0 Normalization

A normalization by 1/sqrt(10) has been used herein when using a 16QAM symbol, and is performed in a manner known to the person skilled in the art. Normalization is used in order to have an average unit energy of 1 for the symbols constituting the 16QAM constellation. One would typically use the same approach when calculating a normalization factor for the network coding constellations. These normalizations would also be used after performing reciprocal modulation (in case we are using that method to perform network coding). Since the receiver knows the modulations of each of the distinct symbols forming the network coded symbol (this information is sent in the exact same way as it is signaled which constellation was used to perform network coding), it can conclude the normalization constant and use it. Of course, other types of normalizations with different purposes than ensure an average unit energy can be also used without affecting the technology disclosed herein.

8.0 Noise

In the foregoing example scenarios it has been assumed that the noise was equal to zero. In general this is not the case, but the noise would simply represent a distortion in the amplitude and/or phase of the network decoded signal, which is not different from the effect of noise on signals transmitted without any network coding operation. The effects of noise and/or fading are not introduced by the technology disclosed herein (since, as showed above, in a noise and fading free system, the network decoding is able to correctly retrieve the exact symbols used for network coding), and are dealt with by the demodulation (as is done in conventional solutions today). The role of the technology disclosed herein at the receiver is to first decouple the two network coded data entities and obtain, for the desired data entities, soft or hard estimates that are possibly distorted by fading and/or noise. This distortion will be seen as a discrepancy between the network decoded values and the actual points in the constellation space (exactly as in conventional demodulation).

9.0 Links and Communication Interfaces

Typically but not necessarily the communication interfaces (such as communications interface 42 and communication interface 46) as describe herein includes a transmitter and a receiver. The transmitter is capable of transmitting signals from the communication node over one or more communication links. The receiver is capable of receiving signals at the communication node from one or more communication links. Transmitter and receiver may be jointly realized as a transceiver. The links may be wireless links, wiredlinks, both, or a combination thereof, and so forth.

The technology in this application provides the possibility of modulating different distinct signals with different modulation levels prior to performing the network-coding operation on them. This is a major advantage when applied to bidirectional relaying if the links are asymmetrical (i.e. one link has a low SINR and the other has a high SINR) as the transmission is no longer limited by the link from the node performing the network coding operation to the weakest receiving node (i.e. in order to ensure a correct reception by all receiving nodes).

Aspects of the technology disclosed herein including but not limited to novel transmit constellations thus enable the use of multiplicative network coding even when the modulation scheme used by the distinct signals contains information in the phase domain and in the amplitude domain. For instance, it would be possible to use multiplicative network coding on distinct signals using higher order QAM (instead of having to use higher order PSK, which have a worse BER performance as opposed to their QAM counterparts). The proposed method is simple to apply and does not require any changes to the decoder structure as the proposed mapping from the transmit constellation to the distinct signal's actual constellation (i.e. the network-decoding operation) is transparent to the decoder. The proposed method allows use of different modulation schemes when transmitting a network coded signal in case of bidirectional relaying, hence overcoming a major limitation for such topologies: the asymmetry of the links network-coding node to user 1, and network-coding node to user 2. For instance, it would be possible to send a network coded signal with distinct signals having completely different modulation schemes (e.g. BPSK and 64QAM) as opposed to being constrained by the weakest link (e.g. using BPSK on both links instead of BPSK on the weak link and 64QAM on the strong link).

10.0 References Incorporated by Reference

R. Ahlswede, N. Cai, S.-Y. R. Li, and R. W. Yeung. Network information flow.

IEEE Trans. Info. Theory, July 2000.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a communications network comprising:
    at a network node performing network encoding upon a first signal and a second signal to obtain a network coded signal, the first signal being modulated by a first modulation scheme and the second signal being modulated by a second modulation scheme, at least one of the first signal and the second signal including information in a phase domain and information in an amplitude domain;
    transmitting the network coded signal over a communication link to a receiver;
    performing network decoding of the network coded signal as detected at the receiver to obtain the second signal, the receiver knowing and using the first signal for the network decoding;
    performing the network encoding by performing reciprocal modulation of the first signal and the second signal to obtain a reciprocally modulated symbol that comprises information in both the phase domain and the amplitude domain;
    wherein performing the network coding to obtain the reciprocally modulated symbol comprises:
        multiplying amplitudes of the first signal and the second signal to form an amplitude component of the reciprocally modulated symbol;
        adding phases of the first signal and the second signal to form a phase component of the reciprocally modulated symbol;
        translating the phase component into a consequent complex value with unit magnitude; and
        multiplying the amplitude component of the reciprocally modulated symbol and the phase component of the reciprocally modulated symbol to obtain the reciprocally modulated symbol.

2. A method of operating a communications network comprising:
    at a network node performing network encoding upon a first signal and a second signal to obtain a network coded signal, the first signal being modulated by a first modulation scheme and the second signal being modulated by a second modulation scheme, at least one of the first signal and the second signal including information in a phase domain and information in an amplitude domain;
    transmitting the network coded signal over a communication link to a receiver;
    performing network decoding of the network coded signal as detected at the receiver to obtain the second signal, the receiver knowing and using the first signal for the network decoding;
    performing the network encoding by performing reciprocal modulation of the first signal and the second signal to obtain a reciprocally modulated symbol that comprises information in both the phase domain and the amplitude domain;
    wherein performing network decoding of the network coded signal as detected at the receiver further comprises:
        removing an amplitude contribution of the first signal from the reciprocally modulated symbol to obtain an amplitude component of the second signal;
        removing a phase contribution of the first signal from the reciprocally modulated symbol to obtain a phase component of the second signal; and
        combining the amplitude component of the second signal and the phase component of the second signal to obtain the second signal.

3. A method of operating a communications network comprising:
    at a network node performing network encoding upon a first signal and a second signal to obtain a network coded signal, the first signal being modulated by a first modulation scheme and the second signal being modulated by a second modulation scheme, at least one of the first signal and the second signal including information in a phase domain and information in an amplitude domain;
    transmitting the network coded signal over a communication link to a receiver;
    performing network decoding of the network coded signal as detected at the receiver to obtain the second signal, the receiver knowing and using the first signal for the network decoding;
    mapping the network coded signal into a transmit constellation, the transmit constellation being obtained using a first constellation of the first modulation scheme of the first signal and a second constellation of a second modulation scheme of the second signal;
    also transmitting over the communication link an indication of the transmit constellation; and
    at the receiver using the detected network coded signal, the first signal, and the transmit constellation to obtain the second signal.

4. The method of claim 3, further comprising obtaining the transmit constellation by multiplying every symbol of the first constellation by every symbol of the second constellation.

5. The method of claim 3, wherein the detected network coded signal represents a network coded symbol mapped into the transmit constellation, and wherein using the network coded signal to obtain the second signal comprises de-mapping the network coded symbol from the transmit constellation to the second constellation by compensating the network coded symbol for phase and amplitude of the first signal.

6. The method of claim 5, wherein compensating the network coded symbol for phase and amplitude of the first signal further comprises:
    performing amplitude compensation to compensate for amplitude of the first signal; and then performing phase compensation to compensate for phase of the first signal.

7. The method of claim 5, wherein compensating the network coded symbol for phase and amplitude of the first signal further comprises:
    performing phase compensation to compensate for phase of the first signal; and then
    performing amplitude compensation to compensate for amplitude of the first signal.

8. The method of claim 1, further comprising demodulating the second signal according to the second modulation scheme.

9. A network coding node of a communications network comprising:
    a multi-domain network coding unit configured to network encode a first signal and a second signal to obtain a network coded signal, the first signal being modulated by a first modulation scheme and the second signal being modulated by a second modulation scheme, at least one of the first signal and the second signal including information in a phase domain and information in an amplitude domain;

a communications interface configured to transmit the network coded signal over a communication link to a receiver;
wherein the multi-domain network coding unit comprises a reciprocal modulator configured to perform the network encoding by performing reciprocal modulation of the first signal and the second signal to obtain a reciprocally modulated symbol that comprises information in both the phase domain and the amplitude domain; and
wherein the reciprocal modulator comprises:
   a signal multiplier configured to multiply amplitudes of the first signal and the second signal to form an amplitude component of the reciprocally modulated symbol;
   an adder configured to add phases of the first signal and the second signal to form a phase component of the reciprocally modulated symbol;
   a phase translation unit configured to translate the phase into a consequent complex value with unit magnitude; and
   a component multiplier configured to multiply the amplitude component of the reciprocally modulated symbol and the phase translated component of the reciprocally modulated symbol to obtain the reciprocally modulated symbol.

10. A network coding node of a communications network comprising:
   a multi-domain network coding unit configured to network encode a first signal and a second signal to obtain a network coded signal, the first signal being modulated by a first modulation scheme and the second signal being modulated by a second modulation scheme, at least one of the first signal and the second signal including information in a phase domain and information in an amplitude domain;
   a communications interface configured to transmit the network coded signal over a communication link to a receiver;
   the multi-domain network coding unit further comprises a transmit constellation generator the transmit constellation generator being configured to use a first constellation of the first modulation scheme of the first signal and a second constellation of a second modulation scheme of the second signal to obtain a transmit constellation;
   wherein the multi-domain network coding unit comprises a mapping unit configured to map the network coded signal into the transmit constellation; and
   wherein the communications interface is also configured to transmit over the communication link an indication of the transmit constellation.

11. The node of claim 10, wherein the constellation generator is configured to obtain the transmit constellation by multiplying every symbol of the first constellation by every symbol of the second constellation.

12. A network decoding node comprising:
   a communications interface configured to receive a network encoded signal over an air interface;
   a multi-domain network decoding unit configured to perform network decoding of the network coded signal as detected at the communications interface to obtain a second signal, the multi-domain network decoding unit knowing a first signal for the network decoding and knowing that the network coded signal was generated by performing network encoding upon the first signal and the second signal, the first signal being modulated by a first modulation scheme and the second signal being modulated by a second modulation scheme at least one of the first signal and the second signal including information in a phase domain and information in an amplitude domain;
   wherein the network coded signal is obtained by reciprocal modulation of the first signal and the second signal to obtain a reciprocally modulated symbol that comprises information in both the phase domain and the amplitude domain, and wherein the multi-domain network decoding unit further comprises:
   an amplitude removal unit configured to remove an amplitude contribution of the first signal from the reciprocally modulated symbol to obtain an amplitude component of the second signal;
   a phase removal unit configured to remove a phase contribution of the first signal from the reciprocally modulated symbol to obtain a phase component of the second signal; and
   a combining unit configured to combine the amplitude component of the second signal and a translated phase component of the second signal to obtain the second signal.

13. A network decoding node comprising:
   a communications interface configured to receive a network encoded signal over an air interface;
   a multi-domain network decoding unit configured to perform network decoding of the network coded signal as detected at the communications interface to obtain a second signal, the multi-domain network decoding unit knowing a first signal for the network decoding and knowing that the network coded signal was generated by performing network encoding upon the first signal and the second signal, the first signal being modulated by a first modulation scheme and the second signal being modulated by a second modulation scheme at least one of the first signal and the second signal including information in a phase domain and information in an amplitude domain;
   wherein the detected network coded signal represents a network coded symbol mapped into a transmit constellation, the transmit constellation being obtained using a first constellation of the first modulation scheme of the first signal and a second constellation of a second modulation scheme of the second signal;
   wherein the communications interface is also configured to receive over the communication link an indication of the transmit constellation; and
   wherein the multi-domain network decoding unit further comprises a de-mapping unit configured to de-map the network coded symbol from the transmit constellation to the second constellation by compensating the network coded symbol for phase and amplitude of the first signal.

14. The node of claim 13, wherein the de-mapping unit is further configured to perform phase compensation to compensate for phase of the first signal before performing amplitude compensation to compensate for amplitude of the first signal.

15. The node of claim 13, wherein the de-mapping unit is further configured to perform amplitude compensation to compensate for amplitude of the first signal before performing phase compensation to compensate for phase of the first signal.

16. The node of claim 12, further comprising a demodulator configured to demodulate the second signal according to the second modulation scheme.

* * * * *

UNITED STATES PATENT AND TRADEMARK OFFICE
CERTIFICATE OF CORRECTION

| | |
|---|---|
| PATENT NO. | : 9,025,503 B2 |
| APPLICATION NO. | : 13/889811 |
| DATED | : May 5, 2015 |
| INVENTOR(S) | : Manssour |

It is certified that error appears in the above-identified patent and that said Letters Patent is hereby corrected as shown below:

In the Drawings

In Fig. 8, Sheet 7 of 18, delete "  " and insert --  --, therefor.

In Fig. 19, Sheet 15 of 18, for Tag "84", in Line 2, delete "REVERSAL" and insert -- REMOVAL --, therefor.

In Fig. 19, Sheet 15 of 18, for Tag "82", in Line 2, delete "REVERSAL" and insert -- REMOVAL --, therefor.

In the Specification

In Column 18, Line 20, delete "decoding unit 72" and insert -- decoding unit 50 --, therefor.

In Column 20, Line 56, delete "Implmentations" and insert -- Implementations --, therefor.

Signed and Sealed this
Fifteenth Day of March, 2016

Michelle K. Lee
*Director of the United States Patent and Trademark Office*